US009527735B2

(12) United States Patent
Tenne et al.

(10) Patent No.: US 9,527,735 B2
(45) Date of Patent: Dec. 27, 2016

(54) CATALYTIC PROCESSES FOR OBTAINING INORGANIC NANOSTRUCTURES BY USING SOFT METALS

(71) Applicants: YEDA RESEARCH AND DEVELOPMENT CO. LTD., Rehovot (IL); B. G. Negev Technologies and Applications Ltd., Be'er Sheva (IL)

(72) Inventors: Reshef Tenne, Rehovot (IL); Olga Brontvein, Rehovot (IL); Jeffrey Gordon, Medreshet Ben-Gurion (IL); Daniel Feuerman, Medreshet Ben-Gurion (IL)

(73) Assignees: YEDA RESEARCH AND DEVELOPMENT CO. LTD., Rehovot (IL); B. G. Negev Technologies and Applications Ltd., Be'er Sheva (IL)

( * ) Notice: Subject to any disclaimer, the term of this patent is extended or adjusted under 35 U.S.C. 154(b) by 8 days.

(21) Appl. No.: 14/635,345

(22) Filed: Mar. 2, 2015

(65) Prior Publication Data
US 2015/0225237 A1    Aug. 13, 2015

Related U.S. Application Data

(63) Continuation-in-part of application No. PCT/IL2013/050732, filed on Aug. 28, 2013.

(60) Provisional application No. 61/693,801, filed on Aug. 28, 2012.

(51) Int. Cl.
| H01B 1/10 | (2006.01) |
| C01B 19/00 | (2006.01) |
| H01B 1/08 | (2006.01) |
| C01G 39/00 | (2006.01) |
| C01G 39/02 | (2006.01) |
| C01G 39/06 | (2006.01) |
| C01G 41/00 | (2006.01) |
| C01G 41/02 | (2006.01) |
| C01B 13/32 | (2006.01) |
| C01B 13/36 | (2006.01) |
| B82Y 30/00 | (2011.01) |
| C10M 125/22 | (2006.01) |
| H01B 1/06 | (2006.01) |

(52) U.S. Cl.
CPC .............. *C01B 19/007* (2013.01); *B82Y 30/00* (2013.01); *C01B 13/322* (2013.01); *C01B 13/366* (2013.01); *C01G 39/006* (2013.01); *C01G 39/02* (2013.01); *C01G 39/06* (2013.01); *C01G 41/00* (2013.01); *C01G 41/02* (2013.01); *C10M 125/22* (2013.01); *H01B 1/06* (2013.01); *H01B 1/08* (2013.01); *H01B 1/10* (2013.01); *C01P 2002/54* (2013.01); *C01P 2004/03* (2013.01); *C01P 2004/04* (2013.01); *C01P 2004/13* (2013.01); *C01P 2004/16* (2013.01); *C01P 2006/40* (2013.01); *C10M 2201/065* (2013.01); *C10M 2201/066* (2013.01)

(58) Field of Classification Search
CPC ........... B82Y 30/00; B82Y 40/00; H01B 1/10; H01B 1/08; C01B 19/007; C01P 2004/13; C10M 125/22; C10M 2201/065
See application file for complete search history.

(56) References Cited

U.S. PATENT DOCUMENTS

| 2002/0193040 A1 | 12/2002 | Zhou |
| 2003/0099279 A1 | 5/2003 | Venkatasubramanian et al. |
| 2005/0036973 A1 | 2/2005 | Sato et al. |
| 2007/0111319 A1 | 5/2007 | Bastide et al. |
| 2007/0183964 A1 | 8/2007 | Tanda et al. |
| 2010/0227782 A1 | 9/2010 | Tenne et al. |
| 2010/0233454 A1 | 9/2010 | Johnson et al. |
| 2011/0206596 A1* | 8/2011 | Tenne ............... B82Y 30/00 423/463 |
| 2013/0109601 A1* | 5/2013 | Tenne ............... B82Y 30/00 508/169 |
| 2014/0235513 A1 | 8/2014 | Kverel et al. |

FOREIGN PATENT DOCUMENTS

| WO | WO 98/23796 A1 | 6/1998 |
| WO | WO 2006/106517 | 10/2006 |
| WO | WO 2009/034572 A1 | 3/2009 |
| WO | WO 2009098212 A2 * | 8/2009 ............ B92Y 30/00 |
| WO | WO 2011/111044 A1 | 9/2011 |
| WO | WO 2013/057732 A2 | 4/2013 |

OTHER PUBLICATIONS

Albu-Yaron et al. "MoS2 hybrid nanostructures: from octahedral to quasi-spherical shells within individual nanoparticles", Angew Chem Int Ed Engl. Feb. 18, 2011;50(8):1810-4.
Albu Yaron et al. "Preparation and structural characterization of stable Cs2O closed-cage structures", Chem. Int. Ed. 2005, 44, 4169.
Albu Yaron et al. "Synthesis of Fullerene-like Cs2O Nanoparticles by Concentrated Sunlight", Adv. Mater. 2006, 18, 2993-2996.
Alvarez et al. "Solar production of single-wall carbon nanotubes: growth mechanisms studied by electron microscopy and Raman spectroscopy", Appl. Phys. A: Mater. Sci. Process. 2000, 70, 169-173.
Bethune et al. "Cobalt-catalysed growth of carbon nanotubes with single-atomic-layer walls", Nature 1993, 363, 605-607.
Brontvein et al. "New high-temperature Pb-catalyzed synthesis of inorganic nanotubes", J Am Chem Soc. Oct. 3, 2012;134(39):16379-86.
Brontvein et al. "Two-step Synthesis of MoS2 Nanotubes using Shock Waves with Lead as Growth Promoter", Z. Anorg. Allg. Chem. 2014, 640, (6), 1152-1158.

(Continued)

*Primary Examiner* — Timothy Vanoy
(74) *Attorney, Agent, or Firm* — Mark S. Cohen; Pearl Cohen Zedek Latzer Baratz LLP

(57) ABSTRACT

The present invention concerns inorganic nanostructures comprising soft metals at low concentrations and catalytic processes utilizing soft metals for obtaining inorganic nanostructures.

44 Claims, 11 Drawing Sheets

(56) References Cited

OTHER PUBLICATIONS

Chibante et al. "Solar generation of the fullerenes", J. Phys. Chem. 1993, 97, 8696-8700.
Feldman et al. "Bulk Synthesis of Inorganic Fullerene-like MS2 (M=Mo, W) from the Respective Trioxides and the Reaction Mechanism", J. Am. Chem. Soc.1996, 118, 5362-5367.
Feldman et al. "New reactor for production of tungsten disulfide hollow onion-like (inorganic fullerene-like) nanoparticles", Solid State Sci. 2000, 2, 663-672.
Fields et al. "Formation of fullerenes in highly concentrated solar flux", J. Phys. Chem. 1993, 97, 8701-8702.
Flamant et al. "Solar Processing of Materials: Opportunities and New Frontiers",Solar Energy vol. 66, Issue 2, Jun. 1999, pp. 117-132.
Flamant et al. "Solar reactor scaling up:: the fullerene synthesis case study", Energy 2004, 29, 801-809.258103.
Gordon et al. "Singular MoS2, SiO2 and Si nanostructures—synthesis by solar ablation", J. Mater. Chem., 2008, 18, 458-462.
Handa et al. "Formation of MoO2 Nanotube with Rectangular Cross Sections", e-Journal Surf. Sci. and Nanotech. 2009, 7, 307-310.
Hu et al. "Chemistry and Physics in One Dimension: Synthesis and Properties of Nanowires and Nanotubes", Acc. Chem. Res 1999, 32, 435-445.
Iijima et al. "Single-shell carbon nanotubes of 1-nm diameter", Nature 1993, 363, 603-605.
International Search Report for PCT Application No. PCTIL2013050732 mailed on Jan. 8, 2014.
Kihlborg "Stabilization of the Tunnel Structure of Molybdenum Oxide (Mo5o14) by Partial Metal Atom Substitution", Acta Chem. Scand. 1969, 23, 1834-1835.
Kihlborg "The Crystal Structure of $Mo_{17}O_{47}$", Acta Chem. Scand. 1960, 14, 1612-22.
Laplaze et al. "Carbon nanotubes: The solar approach", Carbon 1998, 36, 685-688.
Lauhon et al. "Semiconductor nanowire heterostructures", Philos. Trans. R. Soc. London, Ser. A 2004, 362, 1247-1260.
Levy et al. "Synthesis of Inorganic Fullerene-like Nanostructures by Concentrated Solar and Artificial Light", lsr. J. Chem. 2010, 50, 417-425.
Levi et al. "Hollow $V_2O_5$ Nanoparticles (Fullerene-Like Analogues) Prepared by Laser Ablation", J. Am. Chem. Soc. 2010, 132, 11214-11222.
Margulis et al. "Nested fullerene-like structure", Nature 1993, 365, 113-114.
Merchan-Merchan et al. "Flame synthesis of molybdenum oxide whiskers", vol. 422, Issues 1-3, Apr. 28, 2006, pp. 72-77.
Portemer et al. "Homologues of Mo4O11(mon) in the Mo—W—O System Prepared by Soft Chemistry", vol. 103, Issue 2, Apr. 1993, pp. 403-414.
Remskar et al. "The MoS2 Nanotubes with Defect-Controlled Electric Properties", Nanoscale Res. Lett. 2011, 6, 26.
Tenne et al. "Polyhedral and cylindrical structures of tungsten disulphide", Nature 360, 444-446 (Dec. 3, 1992).
Thess et al. "Crystalline Ropes of Metallic Carbon Nanotubes", Science 1996, 273, 483-487.
Wiesel et al. "Synthesis of WS2 and MoS2 fullerene-like nanoparticles from solid precursors", Nano Research, May 2009, vol. 2, Issue 5, pp. 416-424.
Yamazoe et al. "Structural Effects of Vanadium Substitution in Mo17O47", Acta Chem. Scand., Ser. A 1975, 29, 404-8.
Yella et al. "Bismuth-Catalyzed Growth of SnS2 Nanotubes and Their Stability", Angew. Chem. Int. Ed. 2009, 48, 6426-6430.
Zhu et al. "Nb-doped WS2 nanotubes ", Chemical Physics Letters vol. 342, Issues 1-2, Jul. 6, 2001, pp. 15-21.
Cario et al. (1997). Ab initio hand-structure calculations, physical review, B. Condensed matter, vol. 55 No. 15, Apr. 1, 1997, pp. 9409-9414.
Grippa, et al. (2003). New strontium and rare earth-based mixed niobium misfit sulfides. Solid state sciences, 5(3), 495-502.
Hong et al. (2003). Synthesis of SnS2/SnS fullerene-like nanoparticles: a super lattice with polyhedral shape. Journal of the American Chemical Society, 125(34), 10470-10474.
Jood et al. (2014). Microstructural control and thermoelectric properties of misfit layered sulfides (LaS) 1+ m TS2 (T=CR, Nb): The natural super lattice systems. Chemistry of Materials, 26(8), 2684-2692.

* cited by examiner

CATALYTIC PROCESSES FOR OBTAINING INORGANIC NANOSTRUCTURES BY USING SOFT METALS

CROSS REFERENCE TO RELATED APPLICATIONS

This application is a Continuation-in-Part of International Application Number PCT/IL2013/050732 filed 28 Aug. 2013, which claims priority of U.S. Ser. No. 61/693,801, filed 28 Aug. 2012, each of which is hereby incorporated by reference in its entirety.

TECHNOLOGICAL FIELD

The present invention concerns catalytic processes utilizing soft metals for obtaining inorganic nanostructures.

BACKGROUND

The study of inorganic nanometer-scale materials with hollow closed-cage structures is a rapidly growing field. The first inorganic fullerene-like nanoparticles (IF) and nanotubes (INT) of $WS_2$ and $MoS_2$ [Tenn et al., Nature 1992, 360, 444-446; Margulis et al., Nature 1993, 365, 113-114] were obtained by heating thin metal films (W or Mo) in the presence of gaseous $H_2S$. A variety of layered transition metal chalcogenides such as $TiS_2$, $NbS_2$, $TaS_2$ and other inorganic layered materials have demonstrated the ability to form IF/INT structures, and a number of synthetic routes have been developed, e.g., chemical vapor transport using bromine for INT-$MoS_2$, a bismuth-catalyzed vapor-liquid-solid method for $SnS_2$ nanotubes and superstructure SnS—$SnS_2$ nanotubes.

The most promising method for high yields of almost defect-free IF-$MoS_2$, IF—$WS_2$ IF and INT-$WS_2$ is sulfidization of the respective metal oxides under reducing conditions. For IF-$WS_2$, $WO_3$ spherical nanoparticles were used as solid precursors in a process where the reaction temperature was lower than the sublimation temperature of $WO_3$, so that the kinetically controlled reaction proceeded according to a solid-gas mechanism. INT-$WS_2$ were also prepared by a two-step sulfidization of $WO_{3-x}$ nanoparticles at 800-900° C.: the rapid growth of long non-volatile $W_{18}O_{49}$ nanowhiskers followed by sulfidization under reducing conditions in the same reactor.

The main obstacle for obtaining INT-$MoS_2$ from the respective oxide is the lack of an anisotropic $MoO_{3-x}$ phase that could potentially promote the growth of non-volatile $MoO_{3-x}$ nanowhiskers in a high-temperature reaction. $MoO_2$ nanowhiskers and nanotubes were obtained by flame heating of a molybdenum tip at 2500° C. in an acetylene-oxygen rich atmosphere [Merchan-Merchan et al., Chem. Phys. Lett. 2006, 422, 72-77] where the high temperature, strong temperature gradient and chemical environment promoted the growth of 1-D nanostructures.

Previously, Yamazoe et al. reported that vanadium substitution stabilized a $Mo_{17}O_{47}$ phase [Yamazoe et al., Acta Chem. Scand., Ser. A 1975, 29, 404-8]. Similarly, the $Mo_5O_{11}$ phase was stabilized by adding minute amounts of titanium, niobium and tantalum [Portemer et al., Solid State Chem 1993, 103, 403-414; Kihlborg, L. Acta Chem. Scand. 1969, 23, 1834-1835]. Hence, it was hypothesized that different metals which stabilize asymmetric $MoO_{3-x}$ phases could lead to the growth of nanowhiskers and, subsequently, INT-$MoS_2$.

Metal catalysts are widely used for promoting the growth of 1-D nanoparticles. The most common method is vapor-liquid-solid growth, yielding various nanowires, carbon nanotubes and INT with control of their composition and dimensions. The synthesis of carbon nanotubes has also been realized using homogeneous metal catalysts.

The most common methods for sulfidization of metal oxide powder involve using $H_2S$ gas, which is flammable and toxic, in a reducing atmosphere. Furthermore, the generation of metal selenide and metal telluride nanoparticles requires even more toxic and unstable precursors. These observations motivate the search for other sources of sulfide (selenide and telluride), as well as alternative synthetic techniques.

Solar ablation as a technique for IF/INT synthesis offers the advantage of permitting a large reaction volume in combination with a high vapor pressure of the reactants at reactor temperatures up to ~3000K with an ultra-hot annealing environment. Moreover sharp gradients in heat flux and temperature are created, estimated as high as $10^4$ K/cm. This method has been employed successfully for the synthesis of carbon fullerenes, carbon nanotubes, and an assortment of inorganic nanoparticles [Wiesel et al., Nano Research 2009, 2, 416-424; Levy et al., Isr. J. Chem. 2010, 50, 417-425; Flamant et al., Sol. Energy 1999, 66, 117-132; Albu Yaron et al., Adv. Mater 2006, 18, 2993-2996; Albu-Yaron et al., Angew. Chem. Int. Ed. 2011, 50, 1810-1814].

GENERAL DESCRIPTION

The inventors have now found that by using soft metals, as will be further explained below, metal oxide phases may be stabilized, thereby catalytically facilitating processes for the formation of inorganic nanostructures, by stabilizing and catalyzing oxide-to-chalcogenide transformations.

In one of its aspects, the invention provides a metal-oxide elongated nanostructure of the formula $A_{1-z}M_z$-oxide, wherein in the nanostructure $A_{1-z}M_z$-oxide A is a metal and M is a soft-metal foreign atom present within the lattice structure of A-oxide, and wherein M is different from A (M≠A), and wherein 0<z≤0.05 (namely z≤0.05 and z≠0). In some embodiments, 0<z≤0.1.

The term "Soft metal" is meant to encompass metals which are relatively malleable at room temperature and typically have low melting temperatures. Metals of this kind usually have atomic numbers found in the lower-right part of the periodic table. The atoms of the soft metal reside in the A-oxide lattice as foreign atoms, and as will be further explained below, are used as "growth promoters" for the A-oxide phase. In some embodiments, the soft metal is an atom or an ion of a metal selected from Pb, Bi, Sn, Sb, V, Ga, In, Hg, Nb and mixtures thereof. In some embodiments, the soft metal is an atom or an ion of a metal selected from Au, Ag, Zn, Cu, Al, Th and mixtures thereof.

Within the context of the invention, the term "elongated nanostructures" is meant to encompass discrete particles, at least one of their dimensions being in the nanometric range, typically 2 nm to 500 nm in length or diameter, and in which one of their dimensions (i.e. length) is significantly larger than any of its other dimensions. Specifically, the term refers to nanostructures selected from nanoparticles, nanotubes, nanowires, nanorods and nanowiskers. The term also refers to at least one elongated nanostructure type; thus, the nanostructures may be of a single type of nanoparticles or of a mixture of nanostructure types. The various populations may be classified by the nanostructure size, size distribution, shape, chemical composition, spectroscopic property, topology, and/or other physical or chemical characteristics.

In some embodiments, in the elongated nanostructures of the formula $A_{1-z}M_z$-oxide, as defined above, A is a metal selected from W, Mo, Re, Ti, Zr, Hf, Nb, Ta, Pt, Ru, Rh, Sn, In, and Ga. In some embodiments, A is selected from W, Mo and Re. In some embodiments, where A is selected from W, Mo, Re, Ti, Zr, Hf, Nb, Ta, Pt, Ru, Rh, Sn, In, and Ga (or selected from W, Mo and Re), the soft metal M is selected from Pb, Bi, Sn, Sb, V, Ga, In, Hg, Nb and mixtures thereof. In some embodiments, A is selected from W, Mo and Re. In some embodiments, the soft metal M is selected from Au, Ag, Zn, Cu, Al, Th and mixtures thereof.

In some embodiments, the elongated nanostructures of the formula $A_{1-z}M_z$-oxide are selected from $W_{1-z}M_z$-oxide, $Mo_{1-z}M_z$-oxide, $A_{1-z}Pb_z$-oxide, $A_{1-z}Bi_z$-oxide, and $A_{1-z}Sn_z$-oxide.

In some embodiments, the elongated nanostructures of the formula $A_{1-z}M_z$-oxide are selected from $W_{1-z}M_z$-oxide and $Mo_{1-z}M_z$-oxide, wherein M is selected from Pb, Bi, Sn, Sb, V, Ga, In, Hg and mixtures thereof. In other embodiments, the elongated nanostructures of the formula $A_{1-z}M_z$-oxide are selected from $A_{1-z}Pb_z$-oxide, $A_{1-z}Bi_z$-oxide and $A_{1-z}Sn_z$-oxide, wherein A is selected from W, Mo, Re, Ti, Zr, Hf, Nb, Ta, Pt, Ru, Rh, Sn, In, and Ga.

In some embodiments, the metal-oxide elongated nanostructure may be selected from $W_{1-z}Pb_z$-oxide, $Mo_{1-z}Pb_z$-oxide, $W_{1-z}Pb_z$-oxide, $Mo_{1-z}Pb_z$-oxide, $W_{1-z}Bi_z$-oxide, $Mo_{1-z}Bi_z$-oxide, $W_{1-z}Bi_z$-oxide, $Mo_{1-z}Bi_z$-oxide, $W_{1-z}Sn_z$-oxide, $Mo_{1-z}Sn_z$-oxide, $W_{1-z}Sn_z$-oxide, $Mo_{1-z}Sn_z$-oxide, and others.

The nanotubes formed by the process of the invention are inorganic nanotubes (INTs), selected in a non-limiting fashion from single-walled INT, multi-walled INT, double-walled INT and a few-walled INT.

The nanowires, nanowhiskers or nanotubes formed in the different steps of a process according to the invention have an aspect-ratio (the ratio of length of the nanostructure to its width) greater than 10; in some embodiments greater than 100; in some embodiments greater than 500; and in further embodiments greater than 1,000.

In some embodiments, the nanostructure is selected from a nanorod, a nanowire and a nanowhisker. Typically, nanorods have an aspect ratio of between about 3-10, nanowires and nanowhiskers having a larger aspect ratio, e.g. of between about 50 to 1,000.

Without wishing to be bound by theory, the non-stoichiometric metal oxides of the invention have a highly non-uniform unit cell and therefore mostly grow perpendicular to the longest unit direction, usually the b-axis due to the rich density of unsaturated bonds in the [0b0] surface, resulting in elongated structures.

In some embodiments, in the nanostructure of the formula $A_{1-z}M_z$-oxide, z is between about 0.01 and 0.05 (i.e. between 1 at % and 5 at %). In some embodiments, z may be between 0.01 and 0.02, between 0.01 and 0.03, or between 0.01 and 0.04. In other embodiments, z may be between 0.02 and 0.05, between 0.03 and 0.05, or between 0.04 and 0.05. In some embodiments, $0<z\leq0.1$.

In other embodiments, in the nanostructure of the formula $A_{1-z}M_z$-oxide, z is between 0.001 and 0.01 (between 0.1 at % and 1 at %). In some embodiments, z may be between 0.001 and 0.0075, between 0.001 and 0.005, or between 0.001 and 0.0025. In other embodiments, z may be between 0.0025 and 0.01, between 0.005 and 0.01, or between 0.0075 and 0.01.

In another aspect of the invention, there is provided a process for preparing a metal-oxide elongated nanostructure of the formula $A_{1-z}M_z$-oxide, wherein A being a metal and M being a soft-metal foreign atom within the lattice structure of A-oxide, M being different than A, wherein $0<z\leq0.05$, the process comprising providing a source of A atoms and a source for M atoms, and treating the A atoms and the M atoms under conditions permitting the formation of elongated nanostructures of the formula $A_{1-z}M_z$-oxide, wherein each of A, M and z are as defined hereinabove. In some embodiments, $0<z\leq0.1$.

In some other embodiments, the nanostructure is selected from a nanorod, a nanowire and a nanowhisker.

In additional embodiments, the nanostructure may be a nanowhisker grown perpendicularly to a surface of the A-atoms source. Thus, in such embodiments the nanostructure obtained by the process of the invention comprises an A atoms source having at least one surface, wherein the $A_{1-z}M_z$-oxide is grown from said source in a direction perpendicular to said surface.

According to some embodiments, z is between 0.01 and 0.05. According to other embodiments, z may be between 0.001 and 0.01. In some embodiments, $0<z\leq0.1$.

In some embodiments, the source of A atoms is selected from A-chalcogenide, A-oxide, A-halide, and elemental A metal. In other embodiments, the source of M atoms is selected from M-chalcogenide, M-oxide, M-halide, M-nitrate, and elemental M metal. The A atoms source and the M atoms source may be provided, independently, in solid form (i.e. powders, bulk material, solid block, platelets, etc.), in solution form, in melt form, or in gas form.

According to some embodiments, said conditions are at least one of an oxidative environment, elevated temperature, and reduced pressure.

In such embodiments, said oxidative environment may be selected from atmospheric oxygen, water vapors and an oxidizer compound.

In other such embodiments, said elevated temperature is between about 500 and 1,500° C. In some other embodiments, said elevated temperature is between about 750 and 1,300° C.

In another one of its aspects, the invention provides a process for preparing metal-chalcogenide nanotubes of the formula $A_{1-x}M_x$-chalcogenide, A being a metal and M being a soft-metal foreign atom within the lattice structure of A-chalcogenide, M being different than A, the process comprises exposing nanostructures in the form of nanowires or nanowhiskers of A-oxide of the formula $A_{1-z}M_z$oxide, in solid phase, to a chalcogen-rich gaseous environment under conditions permitting transformation of $A_{1-z}M_z$-oxide to metal-chalcogenide nanotubes of the formula $A_{1-x}M_x$-chalcogenide, x being equal to or smaller than z, and wherein $0<z\leq0.05$. In some embodiments, $0<z\leq0.1$.

In some embodiments, A is a metal selected from W, Mo, Re, Ti, Zr, Hf, Nb, Ta, Pt, Ru, Rh, Sn, In, and Ga. In some embodiments, A is selected from W, Mo and Re.

In other embodiments, M is a soft metallic element, which may be selected from Pb, Bi, Sn, Sb, V, Ga, In, Hg, Nb and mixtures thereof. In some embodiments, the soft metal M is selected from Au, Ag, Zn, Cu, Al, Th and mixtures thereof.

In the process of this aspect of the invention, nanowires or nanowhiskers of the formula $A_{1-z}M_z$-oxide, in a solid form, are reacted with a chalcogene-rich gaseous composition for chalcogenating the oxide into the corresponding $A_{1-x}M_x$-chalcogenide. Without wishing to be bound by theory, while the M atoms serve to stabilize the oxide phase, they are practically insoluble in the metal-chalcogenide phase, thus are dispelled from the metal-chalcogenide lattices constructing the metal-chalcogenide nanotube. The expulsion of the M atoms from the A-chalcogenide lattice stems also from the significantly different lattices of the A-chalcogenide and the M-chalcogenide.

In some embodiments, x is at most 0.01 (i.e. at most 1 at %). In other embodiments, x is at most 0.001. In some embodiments, x is zero. In such cases the product obtained by the process is A-chalcogenide.

In other embodiments, z is between 0.01 and 0.05 (between 1 at % and 5 at %). In some embodiments, $0<z\leq0.1$.

The formulation of the A-oxide in the nanostructure $A_{1-z}M_z$-oxide, as in the structure A-chalcogenide $A_{1-x}M_x$-chalcogenide, refers to a soft metal species M residing within the lattice of A-oxide. As M species may be either in pure metal state (i.e. atoms in interstitial positions within lattice of A-oxide) or as M ions (i.e. part of the stoichiometry of the A-oxide), the formulation $A_{1-z}M_z$-oxide or $A_{1-x}M_x$-chalcogenide is meant to encompass both cases within the context of the present invention and unless specifically noted otherwise.

The soft metal M species may either replace some of the atoms comprising the A-oxide or A-chalcogenide in specific positions of the crystalline lattice, in which case they are referred to as substitutional atoms, when M is in pure metallic state. In cases where the M species are ionic, M is incorporated into the A-oxide as part of the oxide stoichiometry. Higher concentrations of the soft metal atoms may result in alloying and clustering leading to a decrease in catalytic activity of oxide-to-chalcogenide transformation.

In some embodiments, wherein in the metal-chalcogenide of the formula $A_{1-x}M_x$-chalcogenide, M atoms are incorporated in a lattice of A-chalcogenide.

It is of note that in the process of the invention x is equal to or smaller than z; meaning that the atomic concentration of the soft metal atoms in the precursor (oxide) is higher than its concentration in the final nanostructure (the chalcogenide). Without wishing to be bound by theory, this may result from the formation of volatile compounds of the soft metal formed during the chalcogenation process.

The term "chalcogene" refers to atoms of the chemical elements belonging to group VIA (group 16) of the periodic table of the elements. In the context of the present invention, the term refers to an element selected from S, Se and Te. "Chalcogenide" thus refers to compounds which comprise a chalcogene ion, such as a sulfide, selenide and telluride. Within the context of the present invention, although belonging to the group VIA elements, oxygen is not considered a chalcogene.

In some embodiments, the chalcogenide is selected from S, Se and Te.

In some embodiments, the metal chalcogenide nanostructures of the formula $A_{1-x}M_x$-chalcogenide are selected from $W_{1-x}M_x$-chalcogenide, $Mo_{1-x}M_x$-chalcogenide, $Nb_{1-x}M_x$-chalcogenide, $Ta_{1-x}M_x$-chalcogenide, $A_{1-x}Pb_x$-chalcogenide, $A_{1-x}Bi_x$-chalcogenide, and $A_{1-x}Sn_x$-chalcogenide.

In some embodiments, the metal chalcogenide nanostructures of the formula $A_{1-x}M_x$-chalcogenide are selected from $W_{1-x}M_x$-chalcogenide, $Mo_{1-x}M_x$-chalcogenide, $Nb_{1-x}M_x$-chalcogenide and $Ta_{1-x}M_x$-chalcogenide, wherein M is selected from Pb, Bi, Sn, Sb, V, Ga, In, Hg, Nb and mixtures thereof. In some embodiments, the soft metal M is selected from Au, Ag, Zn, Cu, Al, Th and mixtures thereof.

In other embodiments, the nanostructures of the formula $A_{1-x}M_x$-chalcogenide are selected from $A_{1-x}Pb_x$-chalcogenide, $A_{1-x}Bi_x$-chalcogenide, and $A_{1-x}Sn_x$-chalcogenide, wherein A is selected from W, Mo, Re, Ti, Zr, Hf, Nb, Ta, Pt, Ru, Rh, Sn, In, and Ga.

In some embodiments, the metal chalcogenide nanostructures of the formula $A_{1-x}M_x$-chalcogenide are selected from $W_{1-x}M_x$-chalcogenide, $Mo_{1-x}M_x$-chalcogenide, $Nb_{1-x}M_x$-chalcogenide, $Ta_{1-x}M_x$-chalcogenide, $A_{1-x}Pb_x$-chalcogenide, $A_{1-x}Bi_x$-chalcogenide, and $A_{1-x}Sn_x$-chalcogenide, wherein the chalcogenide atom is selected from S, Se and Te.

In some embodiments, the metal chalcogenide nanostructures of the formula $A_{1-x}M_x$-chalcogenide are selected from $W_{1-x}M_x$-$S_2$, $Mo_{1-x}M_x$-$S_2$, $Nb_{1-x}M_x$-$S_2$, $Ta_{1-x}M_x$-$S_2$, $A_{1-x}Pb_x$—$S_2$, $A_{1-x}Bi_x$—$S_2$, $A_{1-x}Sn_x$—$S_2$, $W_{1-x}M_x Se_2$, $Nb_{1-x}$-$M_x$-$Se_2$, $Ta_{1-x}$-$M_x$-$S_2$, $A_{1-x}Pb_x$—$Se_2$, $A_{1-x}Bi_x$—$Se_2$, $A_{1-x}Sn_x$—$Se_2$, $W_{1-x}M_x$-$Te_2$, $Mo_{1-x}M_x$-$Te_2$, $Nb_{1-x}M_x$-$Te_2$, $Ta_{1-x}M_x$-$Te_2$, $A_{1-x}Pb_x$—$Te_2$, $A_{1-x}Bi_x$—$Te_z$, and $A_{1-x}Sn_x$—$Te_2$.

According to some embodiments, the metal-chalcogenide nanotubes are selected from $W_{1-x}Pb_xS_z$, $Mo_{1-x}Pb_xS_2$, $W_{1-x}Pb_xSe_2$, $Mo_{1-x}Pb_xSe_2$, $Nb_{1-x}Bi_xSe_2$, $Ta_{1-x}Sn_xTe_2$, and others.

The oxide-to-chalcogenide transformation occurs when the oxide comprising the soft metal atoms is exposed to a chalcogene-rich gaseous environment under conditions suitable for such transformation to occur. The chalcogene-rich gaseous environment may be vapors of pure chalcogenes, such as sulphur in gaseous form. Alternatively, the gaseous environment may be a mixture of gases, wherein at least one of the gases in the mixture is an inert carrier gas (such as $N_2$ or $Ar_2$) and at least one of the other gases is a reducing agent (such as $H_2S$).

In some embodiments, said conditions are at least one of temperature, pressure and a period of time. In such embodiments, the temperature may be between about 500 and 1,500° C. In other embodiments, the temperature may be between about 750 and 1,200° C.

In some embodiments, said period of time may be between 30 and 1,500 seconds. In other embodiments, the period of time may be between 30 and 1,200 seconds, 30 and 1,000 seconds, 30 and 800 seconds, 30 and 600 seconds, 30 and 400 seconds, 30 and 200 seconds or 30 and 100 seconds.

The metal-chalcogenide nanostructures of the invention may further comprise an additional metallic component, doped or interchelated with the $A_{1-x}M_x$-chalcogenide. Therefore, in another aspect of the invention there is provided a process for preparing metal-chalcogenide nanostructures of the formula $A_{1-x-y}M_xB_y$-chalcogenide, wherein A being a metal and M being a soft-metal foreign atom within the lattice structure of A-chalcogenide, the process comprising:

providing a vapor phase comprising A-oxide of the formula $A_{1-z}M_z$-oxide and B-oxide, provided that $A\neq B$ and $B\neq M$; and permitting said vapor phase to counter-flow a gaseous composition comprising chalcogen-carrying reacting gas, under conditions permitting formation metal-chalcogenide nanostructures of the formula $A_{1-x-y}M_xB_y$-chalcogenide, x being equal to or smaller than z, and wherein $0<z\leq0.05$. In some embodiments, $0<z\leq0.1$.

In some embodiments, A is selected from Mo, W, Re, Ti, Zr, Hf, Nb, Ta, Pt, Ru, Rh, Sn, In and Ga.

In other embodiments, wherein B is a metal selected from Si, Nb, Ta, W, Mo, Sc, Y, La, Hf, Ir, Mn, Ru, Re, Os, V, Au, Rh, Pd, Cr, Co, Fe, and Ni.

In some other embodiments, M is selected from Pb, Bi, Sn, Sb, Ga, In, Hg, Nb and mixtures thereof. In some embodiments, the soft metal M is selected from Au, Ag, Zn, Cu, Al, Th and mixtures thereof.

In further embodiments, the chalcogenide is selected from S, Se and Te.

In some embodiments, the metal chalcogenide nanostructures of the formula $A_{1-x-y}M_xB_y$-chalcogenide are selected from $W_{1-x-y}M_xB_y$-chalcogenide, $Mo_{1-x-y}M_xB_y$-chalcogenide, $Nb_{1-x-y}M_xB_y$-chalcogenide, $Ta_{1-x-y}M_xB_y$-chalcogenide, $A_{1-x-y}Pb_xB_y$-chalcogenide, $A_{1-x-y}Bi_xB_y$-chalcogenide, $A_{1-x-y}Sn_xB_y$-chalcogenide, $A_{1-x-y}M_xNb_y$-chalcogenide, $A_{1-x-y}M_xRe_y$-chalcogenide, $A_{1-x-y}M_xB_y$—$S_2$, $A_{1-x-y}M_xB_y$—$Se_2$, and $A_{1-x-y}M_xB_y$—$Te_2$.

According to some embodiments, the metal-chalcogenide nanotubes are selected from $Mo_{1-x-y}Pb_xRe_yS_2$, $Mo_{1-x-y}Pb_xNb_yS_2$, $W_{1-x-y}Pb_xRe_yS_2$, $W_{1-x-y}Pb_xNb_yS_2$, $Mo_{1-x-y}Pb_xRe_ySe_2$, $Mo_{1-x-y}Pb_xNb_ySe_2$, $W_{1-x-y}Pb_xRe_ySe_2$, and $W_{1-x-y}Pb_xNb_ySe_2$.

The process of this aspect provides compositions of nanostructures, for example inorganic nanotubes (INT) or mixtures thereof with other nanoparticles such as inorganic fullerene-like nanoparticles (IF), wherein B is incorporated into the lattice of the A-chalcogenide as a doping atom, provided that B is different from both A and M.

The dopant atoms or doping atoms refer to atoms of B which are different than both A and M. Such doping alters the nanostructure's characteristics inter alia as a function of the nature of A and B, and the amount of B, i.e. the value of y in the $A_{1-x-y}M_xB_y$-chalcogenide lattice. The doping of $B_y$ in the lattice of the A-chalcogenide produces changes in the electronic properties leading to the formation of high conductivity semiconductors, which are capable of dissipating electrical charges formed during tribological conditions (e.g. tribocharging). This, in turn, reduced the tribological work at interfaces, leading to reduction in the friction coefficient and improved lubrication.

In some embodiments, y is at most 1 at % (i.e. 0.01). In other embodiments, y is between 0.005 at % and 0.1 at % (i.e. 0.00005 and 0.001). In some other embodiments, y is between 0.005 at % and 0.0075 at %, between 0.005 at % and 0.01 at %, between 0.005 at % and 0.025 at %, between 0.005 at % and 0.05 at % or between 0.005% at and 0.075 at %. Note that for ease of presentation, the concentration of B dopants (designated herein by "y") will be given in at % units of measure instead of stoichiometric fraction.

Such embodiments provide for substitutional doping of B atoms (in addition to M dopants) within the lattice of A-chalcogenide. Within the context of electrical conductivity, such doping levels are known as "highly doped materials", wherein the lower the concentration of B dopant, the higher the effect on the conductivity properties of the $A_{1-x-y}M_xB_y$-chalcogenide.

Generically, atom B may have one extra valence electron or may be deficient in one such electron compared to the original A metal atom leading to n-type (donor) and p-type (acceptor) conductivity.

The substitution of B in A may be continuous or alternate substitutions. Continuous substitution are spreads of A and B within each layer alternating randomly (e.g. $(A)_n$-$(B)_n$, n>1). Depending on the concentration of incorporated B, it may replace a single A atom within $A_{1-x}$-chalcogenide matrix forming a structure of ( . . . A)n-B-(A)n-B . . . ). Alternate substitution means that A and B are alternately incorporated into the $A_{1-x}$-chalcogenide lattice ( . . . A-B-A-B . . . ). It should be noted that other modes of substitution of the B in the A-chalcogenide lattice are possible according to the invention. Since the A-chalcogenide may have a layered structure, the substitution with atoms of B may be done randomly in the lattice or every 2, 3, 4, 5, 6, 7, 8, 9 or 10 layers.

In higher concentrations, B atoms are clustered and may be located between the $A_{1-x}M_x$-chalcogenide layers. In such embodiments, y is at most 0.3 (i.e. at most 30 at %).

In some embodiments, in the metal-chalcogenide of the formula $A_{1-x-y}M_xB_y$-chalcogenide, M atoms are incorporated in a lattice of A-chalcogenide.

According to some embodiments, z is between 0.01 and 0.05. According to other embodiments, x is at most 0.01. It is of note that in the process of the invention x is equal to or smaller than z; meaning that the atomic concentration of the soft metal dopant in the precursor (oxide) is higher than its concentration in the final nanostructure (the chalcogenide).

In some embodiments, x is zero. In such cases the product obtained by the process is $A_{1-y}B_y$-chalcogenide.

In the process of forming $A_{1-x-y}M_xB_y$-chalcogenide, a vapor phase comprising the A-oxide of the formula $A_{1-z}M_z$-oxide and the B-oxide, is allowed to counter-flow a gaseous composition comprising chalcogene-carrying reacting gas, under conditions permitting substitution of some of the A atoms with B atoms, as well as oxide-to-chalcogenide transformation.

The counter-flow, i.e. allowing the vapor phase and the gaseous phase to flow one towards the other, provides better contact between the vapor phase and the gaseous composition, and may be carried out in a single or two chambered reaction vessels as described in PCT publications WO 2009/034572, WO 2011/111044 and WO 2006/106517, the contents of which is incorporated herein by reference for its pertinent parts.

In some embodiments, said gaseous composition comprises an inert carrying gas and a chalcogene-carrying reducing agent.

Another process provided by the invention is the process of forming doped metal-chalcogenide nanotubes from a metal-chalcogenide substrate, via the formation of a doped oxide. The doped oxide may be based on such oxide nanostructure having the general formula $A_{1-z}M_z$-oxide disclosed hereinabove.

Thus, in another aspect of the invention, there is provided a process for preparing metal-chalcogenide nanotubes of the formula $A_{1-x}M_x$-chalcogenide, the process comprising:

providing a substrate comprising a metal-chalcogenide of the formula A-chalcogenide and a metal component M;

exposing the substrate to a first temperature for a first period of time in the presence of oxygen to obtain A-oxide of the formula $A_{1-z}M_z$-oxide in the form of nanowires or nanowhiskers; and exposing the A-oxide to a chalcogene-rich gaseous environment under reducing atmosphere, (for example $H_2/N_2$ mixture) at a second temperature for a second period of time to obtain the metal-chalcogenide nanotubes, x being equal to or smaller than z.

The reaction conditions permit formation of a stable A-oxide nanostructure comprising M foreign atoms. Without wishing to be bound by theory, the soft metal M atoms also catalyze the oxide-to-chalcogenide transformation.

In some embodiments, the material $A_{1-z}M_z$-oxide is selected as defined hereinabove. In some embodiments, A is a metal selected from Mo, W, Re, Ti, Zr, Hf, Nb, Ta, Pt, Ru, Rh, Sn, In and Ga. In some embodiments, M is a metal selected from Pb, Bi, V, Hg, Sn, Sb, In, Ga and Nb. In some embodiments, M is selected from Au, Ag, Zn, Cu, Al, Th and mixtures thereof.

In some other embodiments, said chalcogenide is selected from S, Se and Te.

According to some embodiments, x is at most 0.01. According to other embodiments, z is between 0.01 and 0.05. In some embodiments, $0<z\leq0.1$.

In this process, the A-chalcogenide and the metal component M are mixed in a predetermined ratio, which in some embodiments may be 1:1 molar ratio, in order to form the substrate. Then the substrate is exposed to a first temperature for a first period of time, in the presence of oxygen or oxygen source like water vapor, thereby obtaining the formation of nanowires or nanowhiskers of the A-oxide containing M foreign atoms of the formula $A_{1-z}M_z$-oxide. Without wishing to be bound by theory, the use of soft metals serve as "growth promoter", that may assist in stabilizing the oxide phase and therefore the stable growth of nanowires or nanowhiskers perpendicular to the substrate.

Thereafter, the A-oxide of the formula $A_{1-z}M_z$-oxide is exposed to a chalcogen-rich gaseous environment at a second temperature for a second period of time, under reducing conditions, causing oxide-to-chalcogenide transformation and obtaining the metal-chalcogenide nanotubes.

The chalcogene-rich gaseous environment may be obtained by exposing the chacogenide substrate to high temperatures (i.e. the second temperature), thereby releasing elemental chalcogene species from the substrate as vapors. Alternatively, the chalcogene-rich gaseous environment may be provided as a chalcogene-carrying reacting gas, such as a mixture of an inert carrier gas and a chalcogene-containing reducing agent.

The first and second temperatures may be the same or different. In some embodiments, the first temperature is between about 1,600 and 3,500° C., and said second temperature is between about 750 and 1,200° C.

In some embodiments, the first temperature may be between about 1,600 and 3,000° C., between about 1,600 and 2,500° C., or between about 1,600 and 2,000° C.; while the second temperature may be between about 750 and 1100° C., between about 750 and 1,000° C., or between about 750 and 950° C.

In some other embodiments, the first temperature may be between about 2,000 and 3,000° C., between about 2,500 and 3,500° C., or between about 3,000 and 3,500° C.; while the second temperature may be between about 900 and 1,200° C., between about 1,000 and 1,200° C., or between about 1,100 and 1,200° C.

In other embodiments, said first temperature and said second temperature are the same, and being between about 750 and 1,200° C. In some other embodiments, both said first temperature and said second temperature are between about 850 and 1,100° C.

In some embodiments, said first period of time is between 1 sec and 30 min, permitting the formation of stable $A_{1-z}M_z$-oxide nanowires or nanowhiskers. In other embodiments, said first period of time may be between 1 sec and 20 min, 1 sec and 10 min, 1 sec and 5 min, or 1 sec and 1 minute.

In other embodiments, said second period of time is between 30 and 1,500 minutes permitting the oxide-to-chalcogenide transformation. In other embodiments, said second period of time may be between 30 and 1,200 min, 30 and 1,000 min, 30 and 500 min, or 30 and 100 minutes.

Another aspect of the invention provides a process for preparing metal-chalcogenide nanotubes of the formula $A_{1-x}M_x$-chalcogenide, the process comprising exposing a composition that comprises a metal-chalcognide of the formula A-chalcogenide and a metal component M to a temperature of at least 1,600° C. for a predetermined period of time, to thereby obtain the metal-chalcogenide nanotubes.

In some embodiments, said temperature of at least 1,600° C. is obtained by a solar radiation focusing (i.e. solar ablation), as will be further discussed below.

In other embodiments, said temperature may be in a range of between 1,600 and 3,500° C.

In additional embodiments, said predetermined period of time is between 30 and 2,000 seconds.

In another aspect, the invention provides nanostructures prepared according to any one of the processes disclosed herein.

In another aspect, the invention provides use of any nanostructure prepared according to the invention in the preparation of a doped or structured nanostructure.

In another aspect, the present invention provides an elongated nanostructure comprising at least one layer of a metal-chalcogenide the formula $A_{1-x}M_x$-chalcogenide, at least partially coating an inner core of the formula $A_{1-z}M_z$-oxide, x being equal to or smaller than z, and wherein $0<z\leq0.05$. In some embodiments, $0<z\leq0.1$.

The elongated nanostructure has a core/shell structure, that comprises a core of $A_{1-z}M_z$-oxide and at least partially coated by at least one shell (or layer) of $A_{1-x}M_x$-chalcogenide. Where the elongated core/shell nanostructure comprises more than one shell/layer, the nanostructure may then be referred to as a "core/multishell" structure, and may then be designated as core/shell(1)/shell(2) . . . /shell(n), wherein (n) is the number of consecutive shells from 1 to 30. Thus, the number of shells (n) is selected from 1, 2, 3, 4, 5, 6, 7, 8, 9, 10, 11, 12, 13, 14, 15, 16, 17, 18, 19, 20, 21, 22, 23, 24, 25, 26, 27, 28, 29 and 30.

The "core" is the innermost material contained in a core/shell structure, i.e. the $A_{1-z}M_z$-oxide. The core may be positioned concentrically or non-concentrically with respect of each or some of the shell(s).

The term "at least partially coating" is meant to encompass partial coverage of the oxide core by the chalcogenide layer. It is of note, however, that at least one layer is fully closed making a nanotube structure of A-chalcogenide. The coated portion (region) of the core's surface may be of any size and structure, the portion may be continuous or comprise of several non-continuous sub-regions on the core's surface. In some embodiments, the $A_{1-z}M_z$-oxide core is fully coated by the $A_{1-x}M_x$-chalcogenide layer.

The extent of coverage of the $A_{1-z}M_z$-oxide core by the $A_{1-z}M_z$-oxide shell and the number of shell layers depends, inter alia, upon the reaction conditions, such as temperature and period of time in which the chalcogenation process is carried out.

The core of the elongated structure is, in some embodiments, rich in soft metal dopants (i.e. M atoms), while the chalcogenide shell/layer is relatively poor in said soft metal dopants. In some embodiments, x is at most 0.01. In other embodiments, z is between 0.01 and 0.05. In some embodiments, $0<z\leq0.1$.

In some other embodiments, in the metal-chalcogenide of the formula $A_{1-x}M_x$-chalcogenide, M atoms are incorporated in a lattice of A-chalcogenide.

In some embodiments, A is a metal selected from W, Mo, Re, Ti, Zr, Hf, Nb, Ta, Pt, Ru, Rh, Sn, In, and Ga. In other embodiments, M is a metal selected from Pb, Bi, V, Hg, Sn, Sb, In, Nb and Ga. In some embodiments, the M is a metal selected from Au, Ag, Zn, Cu, Al, Th and mixtures thereof.

In further embodiments, said chalcogenide is selected from S, Se and Te.

In some embodiments, M is Pb. In such embodiments, the nanostructures may be such in which A is W and the chalcogenide is S, A is Mo and the chalcogenide is S, A is W and the chalcogenide is Se, and A is Mo and the chalcogenide is Se.

In another one of aspects, the invention provides an elongated nanostructure having a radial dimension and a longitudinal dimension, the nanostructure comprising:

a first portion of said longitudinal dimension comprising a solid core of the formula $A_{1-z}M_z$-oxide at least partially coated by at least one layer of a metal-chalcogenide of the formula $A_{1-x}M_x$-chalcogenide, x being equal to or smaller than z, and a second portion of said longitudinal dimension comprising a hollow nanotube of a metal-chalcogenide of the formula $A_{1-x}M_x$-chalcogenide.

When grown on a substrate, the elongated nanostructure of the invention may comprise two distinct portions (or sections), different in their compositions, and positioned along the longitudinal dimension of the nanostructure. Without being bound by theory, and as will be further elaborated below, the oxide-to-chalcogenide transformation initiates in sections of the nanowire (or nanowhisker) which are proximal to the substrate, i.e. close to the chalcogen source. Upon prolonged exposure to the chalcogen source, the oxide-to-chalcogenide transformation progresses along the longitudinal dimension of the elongated nanostructure.

Therefore, stopping the processes of the invention at discrete periods of time provide for nanostructures having two distinct portions of different compositions: a first portion comprising a solid core of the formula $A_{1-z}M_z$-oxide at least partially coated by at least one layer of a metal-chalcogenide of the formula $A_{1-x}M_x$-chalcogenide, and a second portion comprising a hollow nanotube of a metal-chalcogenide of the formula $A_{1-x}M_x$-chalcogenide.

In some embodiments, A is a metal selected from W, Mo, Re, Ti, Zr, Hf, Nb, Ta, Pt, Ru, Rh, Sn, In, and Ga. In other embodiments, M is a metal selected from Pb, Bi, V, Hg, Sn, Sb, Ga, Nb and In. In some embodiments, M is selected from Au, Ag, Zn, Cu, Al, Th and mixtures thereof.

In some other embodiments, the chalcogenide may be selected from S, Se and Te.

In some embodiments, M is Pb. In such embodiments, the nanostructures may be such in which A is W and the chalcogenide is S, A is Mo and the chalcogenide is S, A is W and the chalcogenide is Se, and A is Mo and the chalcogenide is Se.

According to some embodiments, x is at most 0.01. According to other embodiments, z is between 0.01 and 0.05. In some embodiments, $0 < z \leq 0.1$.

Doping of nanostructures endows n-type or p-type conductivity to these nanostructures and reduced agglomeration and sedimentation. Using such modified nanostructures as additives to lubricating fluids, leads to a reduction in the friction coefficient, i.e. the ratio of the force of friction between two surfaces, of metal-metal interfaces (below 0.015) and their wear behavior under different lubrication conditions. When added to oils, greases, or creams it was found that free electrons produced by substitutional dopant atoms are trapped by defects on the nanoparticle surface. The negatively charged nanoparticles, which are possibly surrounded by a positively-charged ionic atmosphere in the oil, repel each other at close proximity. This effect leads to smaller agglomerates than for the undoped nanoparticles and formation of stable oil suspension, even in the absence of a surfactant.

Therefore, a further aspect of the invention provides compositions comprising the nanostructure prepared by the processes of the invention as herein described.

In some embodiments, the composition may be selected from a lubricant composition, a shock absorbing composition, nanostructured electrical conductor, additives composition to lubricating fluids, self-lubricating coating composition, creams, pharmaceutical creams and coatings.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

The processes of the invention are exploited to drive highly anisotropic and kinetically controlled reactions for synthesizing metal-oxides, and further metal-chalcogenides therefrom. The processes utilize a Pb-catalyzed method to synthesize nanotubes from different metal dichalcogenide nanoparticles using high-temperature processes, along with the elucidation of its multi-step reaction mechanism. The experimental realization of this procedure and deciphering the reaction pathway (opens up new vistas) create new possibilities for the synthesis of yet-unrealized nanotubes from different metal chalcogenide compounds.

The most promising method for obtaining large quantities of INT of $MoS_2$ and $WS_2$ almost defect-free is sulfidization of the respective metal oxides under reducing conditions. INT-$WS_2$ were prepared by sulfidization of $WO_3$, nanoparticles, in a two-steps reaction. In the first step, long $W_{18}O_{49}$ nanowhiskers grew almost instantaneously and subsequently they were sulfidized in the same reactor in reducing conditions to INT of $WS_2$. The $W_{18}O_{49}$ nanoparticles were found to be nonvolatile at the relevant temperatures (800-900° C.). This solid oxide with monoclinic space group (P12/ml) prefers growing as elongated nanowhiskers which could be easily converted into INT-$WS_2$ by fine-tuning the sulfidization reaction.

In the past, INT-$MoS_2$ were synthesized in small amounts by vaporizing the molybdenum oxide powder and subsequent sulfidization of the oxide. However, only small amounts of the nanotubes could be obtained by the reported process, and their size control was rather limited. The asymmetric $Mo_{17}O_{47}$ phase which is an analog of the monoclinic $W_{18}O_{49}$ phase is unstable at high temperatures and decomposes at 560° C. Previously Yamazoe et al. reported that vanadium substitution in $Mo_{17}O_{47}$ stabilizes this phase, so it can be observed at higher temperatures.

The processes of the present invention, as will be further demonstrated below, provide for a new synthetic route by which metal-oxides, such as $MoO_{3-x}$ phase, are stabilized by the use of soft metals doping. This phase promotes the growth of nonvolatile $MoO_{3-x}$ nanowhiskers at a high temperature reaction.

Sample Preparation and the Solar Furnace

Quartz ampoules (12 mm o.d.) were filled with different precursors and sealed under a vacuum of $3 \times 10^{-5}$ torr. All precursors included a TMC ($MoS_2$ (99%, Alfa Aesar), $WS_2$ (99.8%, Alfa Aesar) $MoSe_2$ (99.9%, Strem) or $WSe_2$ (99.8%, Alfa Aesar)) and a metal catalyst in a 1:1 molar ratio. Some precursor mixtures included pure Pb (99.5%, Strem), while others contained a powder consisting of crystallites with a core of pure Pb coated with PbO film in the ratio 40/60 at %. Experiments in which pure PbO powder (99.9%, Acros) was used did not yield the novel nanoparticles detailed below.

Figure 1:
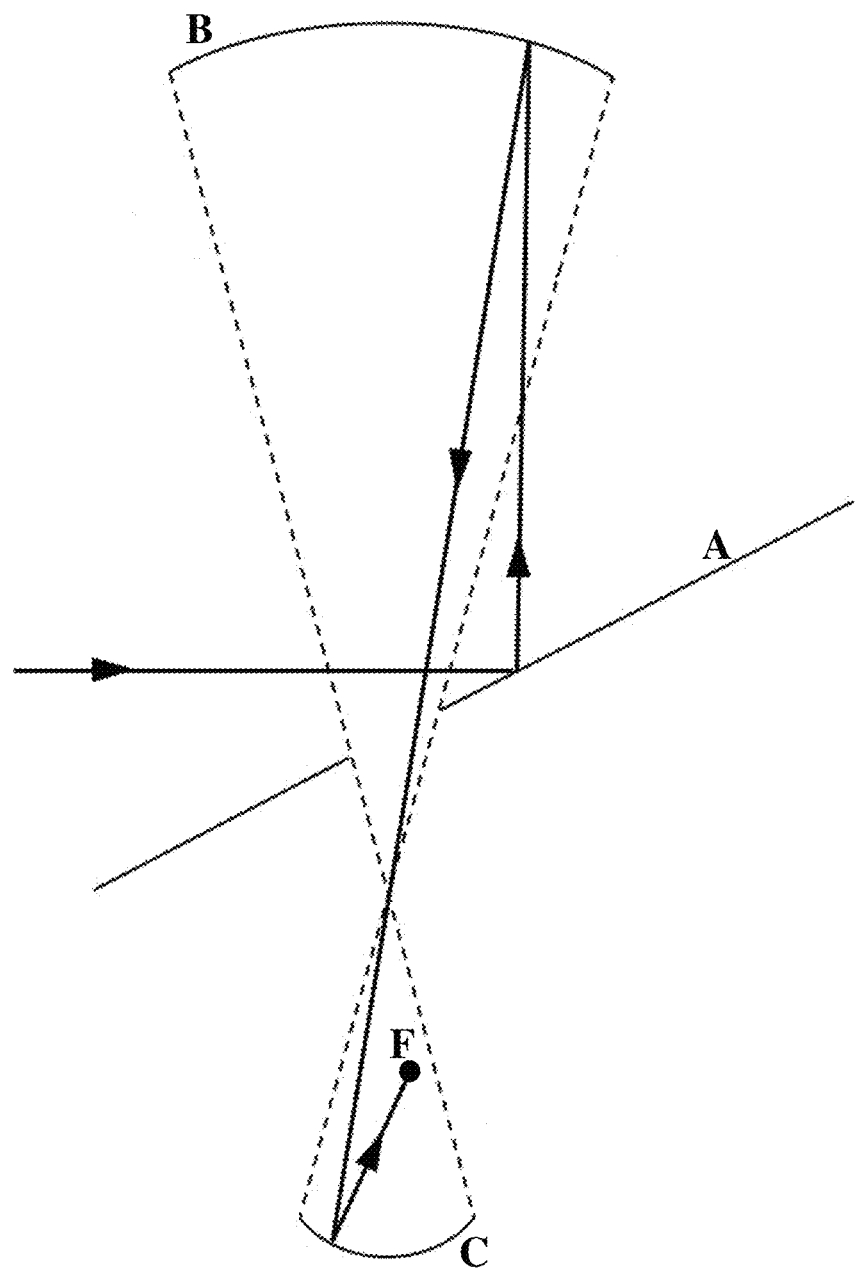
FIG. 1 is a schematic illustration of a solar furnace. Solar radiation is reflected into the lab from an outdoor heliostat, reflected upward by a flat mirror tilted at 45° (A) to a parabolic dish (B), concentrated through a hole in the flat tilted mirror (A), and further concentrated by an ellipsoidal dish (C) to the focus (F) where the ampoule is inserted.

The ampoules were irradiated during exposure times for 30-1200 s by highly concentrated solar beam radiation. A flux concentration of up to ~15,000, i.e. 15 W/mm², on a focal spot a few mm² in area was attained in a solar furnace, as schematically shown in FIG. 1. Reactor temperatures were estimated from known threshold temperatures for syntheses achieved in the same solar ablation facility. One example is the production of carbon nanotubes from pure graphite without catalysis—invariably requiring the sublimation of graphite and hence reactor temperatures reaching ~2700 K. Additional evidence includes both synthesizing $MoS_2$ nano-octahedra in a procedure which requires the vaporization of Mo at temperatures of at least ~2700K, as well as the generation of $SiO_2$ nanowires and nanospheres via the melting and possible vaporization of pure quartz. Determination of reactor temperature was hindered by the blinding effect of concentrated solar radiation reflected off the quartz reactor ampoules, as well as the paucity of suitable thermocouple materials.

Electron Microscopy

The solar ablated samples were examined by electron microscopy techniques, primarily with a Philips CM120 transmission electron microscope (TEM) operating at 120 kV, equipped with an energy-dispersive X-ray spectroscopy (EDS) detector for chemical analysis (EDAX Phoenix Microanalyzer), and secondarily with an LEO model Supra 55VP scanning electron microscope (SEM) equipped with an EDS detector (Oxford model INCA). High-resolution imaging was achieved with an FEI Tecnai F30-UT with a field-emission gun operating at 300 kV. Line-scan EDS analysis was performed with an FEI Tecnai F20 scanning transmission electron microscope (STEM), operating at 200 kV, equipped with a high-angle annular dark field (HAADF) detector and EDS detector (EDAX-Phoenix Microanalyzer).

For atomic resolution analysis, a probe aberration-corrected FEI Titan 80-300 STEM operating at 300 kV equipped with a high-angle annular dark field (HAADF) detector was used.

Scanning and Transmission Electron Microscopy and Electron Diffraction Analysis

Figure 2A:
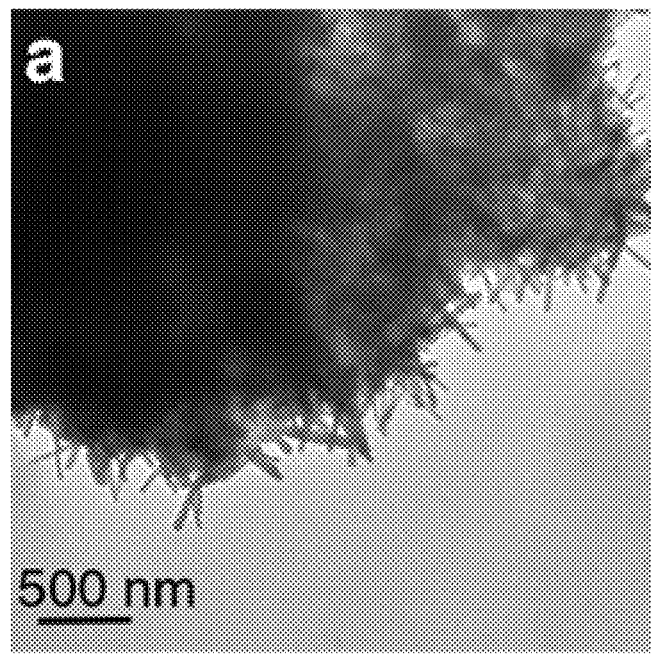
FIGS. 2A-2D are electron microscopy images of representative $MoS_2$ nanotubes after exposure of $MoS_2$ and Pb mixture for 600 s: (A) Lower magnification TEM image; (B) SEM image; (C) High-magnification TEM image of a single hollow $MoS_2$ nanotube; (D) High-magnification TEM image of a filled $MoS_2$ nanotube.
Figure 2B:
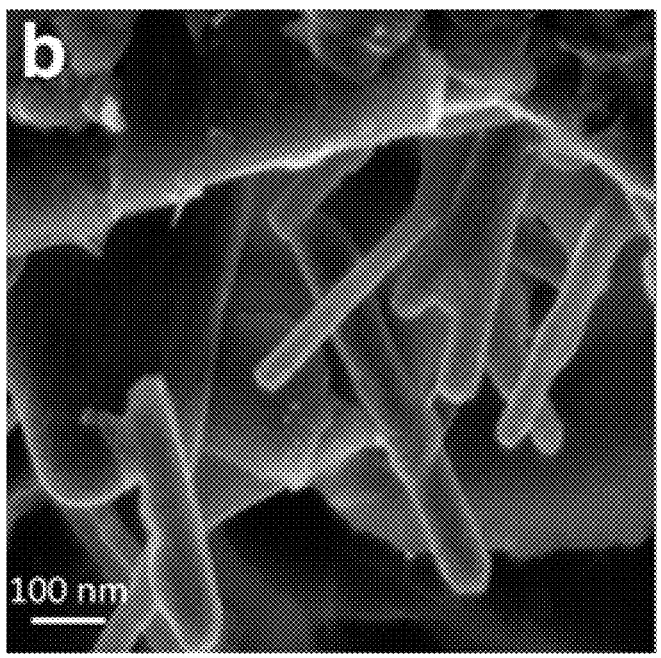
Figure 2C:
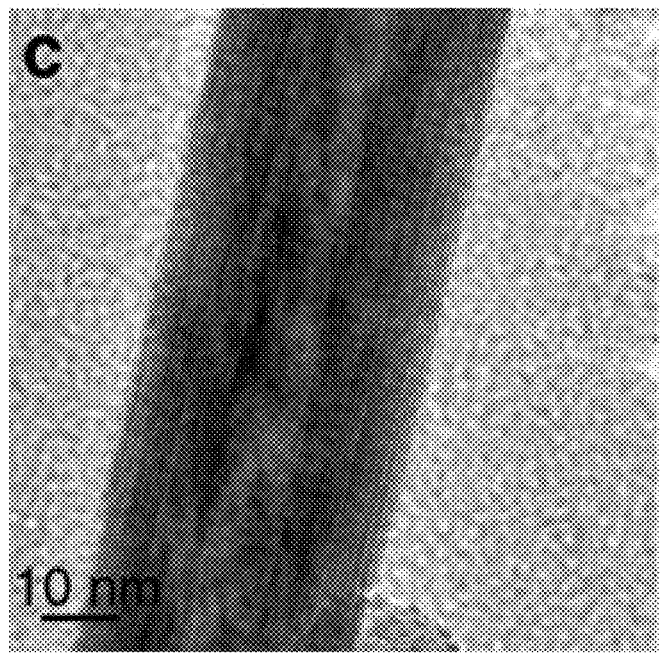
Figure 2D:
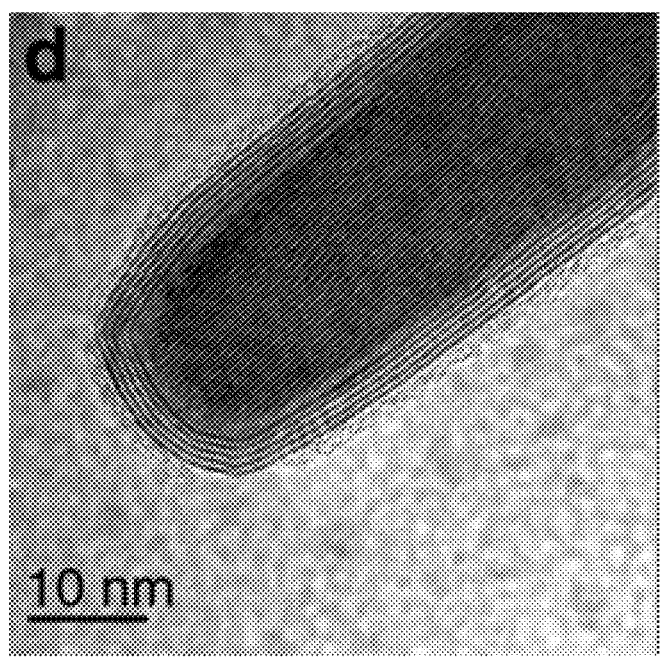

After irradiation of the $MoS_2$ and Pb mixture for 600 s, $MoS_2$ nanotubes were readily apparent (FIG. 2)—mainly with one closed and one open end. The TEM (FIG. 2A) and SEM (FIG. 2B) images show nanotubes growing from $MoS_2$ platelets. The nanotubes were partially filled with a $MoO_{3-x}$ core of non-uniform thickness. Most of the oxide remained near the nanotube's closed end, while the amount of oxide near the nanotube root was much smaller. This observation suggests that the conversion of the oxide nanowhisker to INT-$MoS_2$ by reaction with sulfur vapor emanates from the root. Nanotube dimensions ranged from 100 nm to 1 μm in length, and from 15 to 80 nm in width. The number of layers varied from two (encapsulating a $MoO_{3-x}$ core) to more than 30 (for the fully converted hollow core zones). According to the EDS analysis in the TEM, these nanotubes consist of Mo, S, traces of Pb (~1-5 at %) and, in some cases, oxygen (Table 1). The Pb content is progressively reduced, eventually reaching below 1 at % with the gradual conversion of the oxide core into closed $MoS_2$ layers.

TABLE 1

TEM/EDS analysis of representative nanoparticles

| Sample | O [at %] | S [at %] | Pb [at %] | Mo [at %] |
|---|---|---|---|---|
| INT-$MoS_2$ filled | 25 | 37.5 | 3.3 | 34.2 |
| INT-$MoS_2$ hollow | 17.2 | 50.5 | 1 | 31.3 |
| $MoO_{3-x}$ | 61.4 | 4.8 | 6.2 | 27.6 |

Aberration-corrected TEM revealed a small number of Pb atoms substituting for the Mo atoms in the $MoS_2$ lattice. Additionally, Pb atoms were found advancing in the oxide core at the growth front of the $MoS_2$ layers. This observation indicates that the Pb atoms, which are essential for the high-temperature stability of the oxide nanowhiskers, are ejected or "salted out" by the growing $MoS_2$ layer. Given the large difference between the solubility of Pb in the oxide and sulfide phases, one would expect to find some Pb-rich grains within or near the nanotube. The absence of such grains indicates that the Pb atoms are swept away as a vapor from the growing nanotube or form an unidentified chemical compound. However, it is evident from the high resolution aberration-corrected STEM analysis that some of the remaining Pb atoms replace Mo atoms.

Figure 3A:
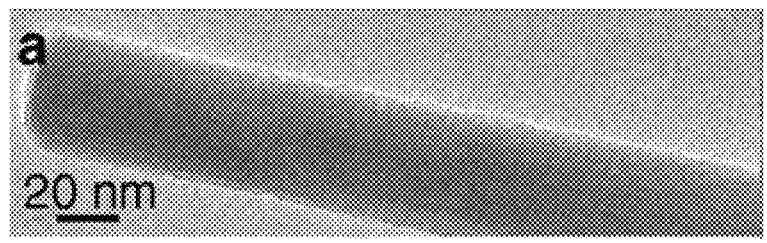
FIGS. 3A-3C present characterization of a single $MoS_2$ nanotube with a crystalline oxide core: (A) Low magnification TEM image; (B) High-resolution TEM image; (C) ED pattern.
Figure 3B:
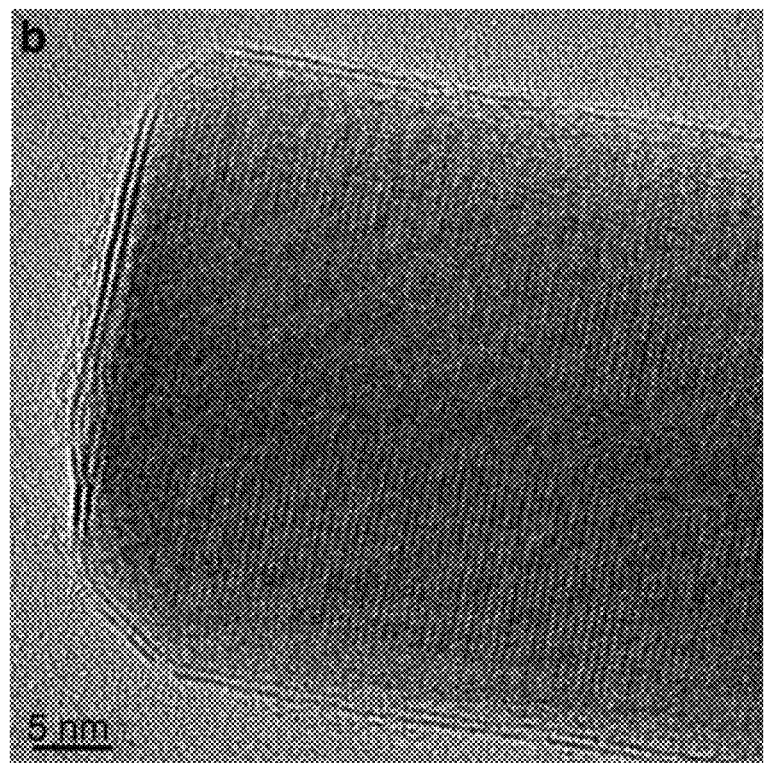
Figure 3C:
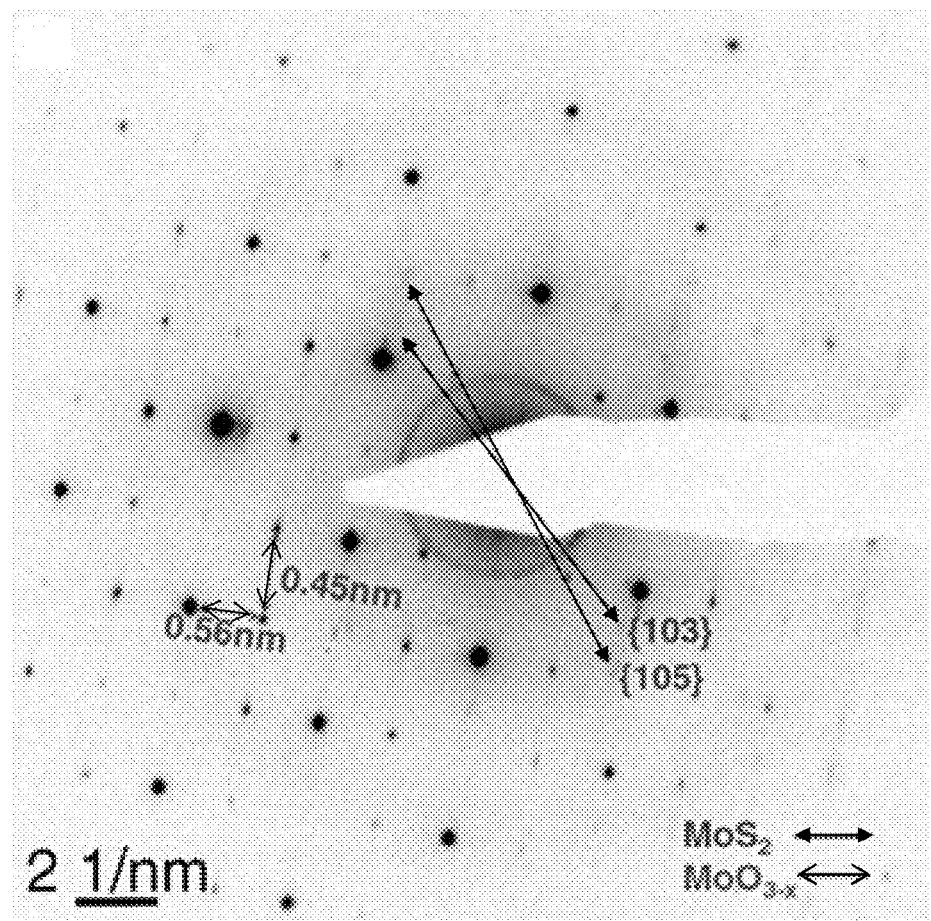

The electron diffraction (ED) pattern of a single $MoS_2$ nanotube (FIG. 3C) has two sets of points that belong to two different structures (lattices). The two pairs of bright spots belong to the $MoS_2$ phase. The points appropriate to a single-crystal structure correspond to $MoO_{3-x}$ in a phase that cannot be defined based on its d-spacing due to the large number of molybdenum sub-oxide phases commensurate with these distances. Without wishing to be bound by theory, this may suggest that Pb atoms may change the d-spacings in some molybdenum sub-oxide phases. The existence of $MoO_{3-x}$ phase in the core of the nanotube, suggests that the water molecules which react with the molybdenum sulfide to form molybdenum oxide produce a hydrogen atmosphere conductive for the high-temperature reduction of the trioxide to the suboxide phase in the nanowhisker core.

Nanotube Formation Mechanism

Figure 4A:
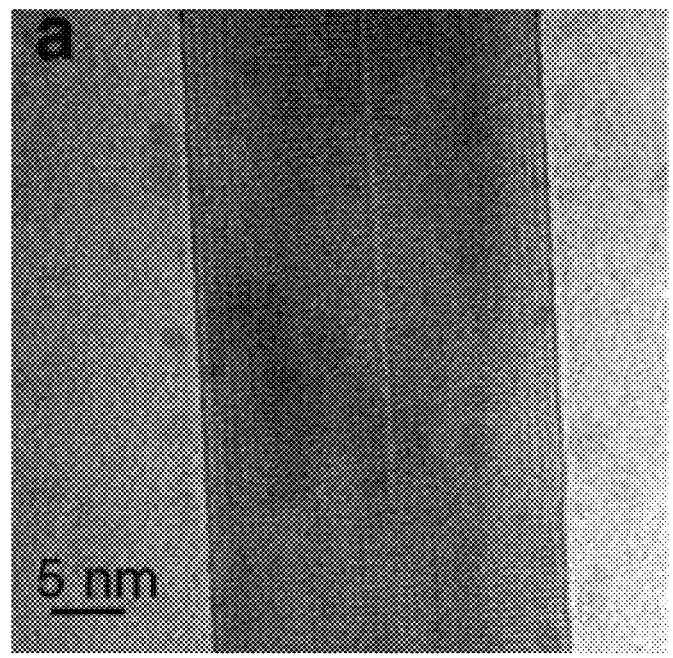
FIGS. 4A-4D show TEM images highlighting the temporal evolution of $MoO_{3-x}$ and $MoS_2$ nanoparticles for varying periods of solar irradiation. (A) $MoO_{3-x}$ nanowhisker after 30 s; (B) $MoO_{3-x}$ nanowhisker covered by a single layer of $MoS_2$ after 60 s; (C) $MoS_2$ nanotube partially filled with $MoO_{3-x}$ after 600 s; (D) Hollow core $MoS_2$ nanotube after 1200 s.
Figure 4B:
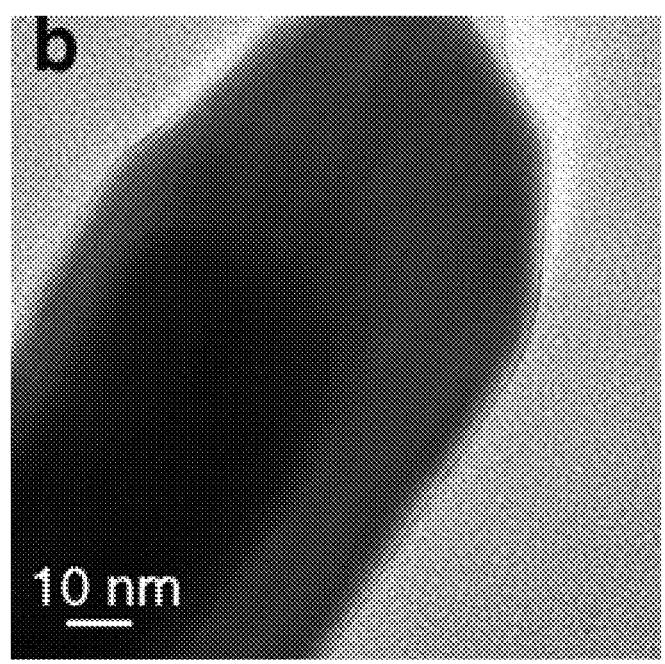
Figure 4C:
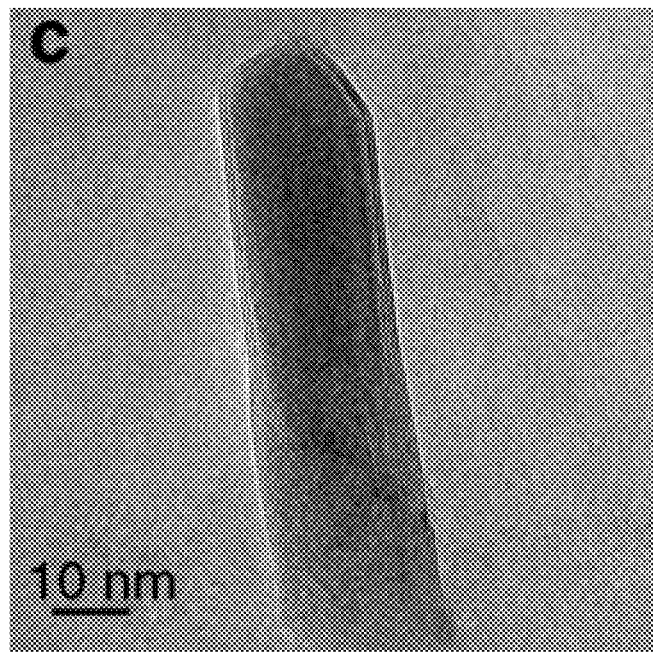
Figure 4D:
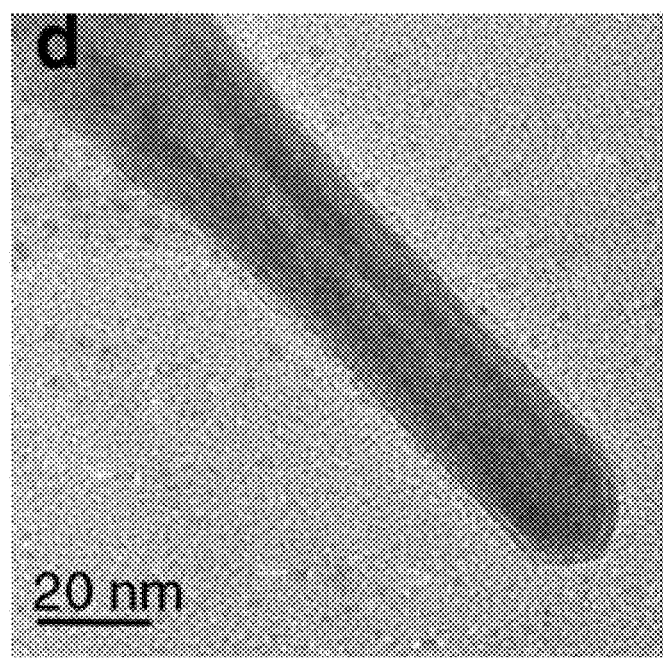

Limiting the solar exposure time to 30 s revealed the generation of $MoO_{3-x}$ nanowhiskers (FIG. 4A). After 60 s, one to two layers of $MoS_2$ surround the $MoO_{3-x}$ nanowhisker (FIG. 4B). Progressively longer irradiation periods reveal a continuous transformation of the $MoO_{3-x}$ nanowhiskers to INT-$MoS_2$ (FIGS. 4C-4D). The EDS analysis reveals 1-5 at % of Pb inside the nanoparticles, throughout the oxide (nanowhiskers) a presence that persists throughout the sulfide (nanotube) conversion. However, the concentration of Pb is noticeably smaller in the sulfide layers than in the molybdenum oxide core.

Figure 5:
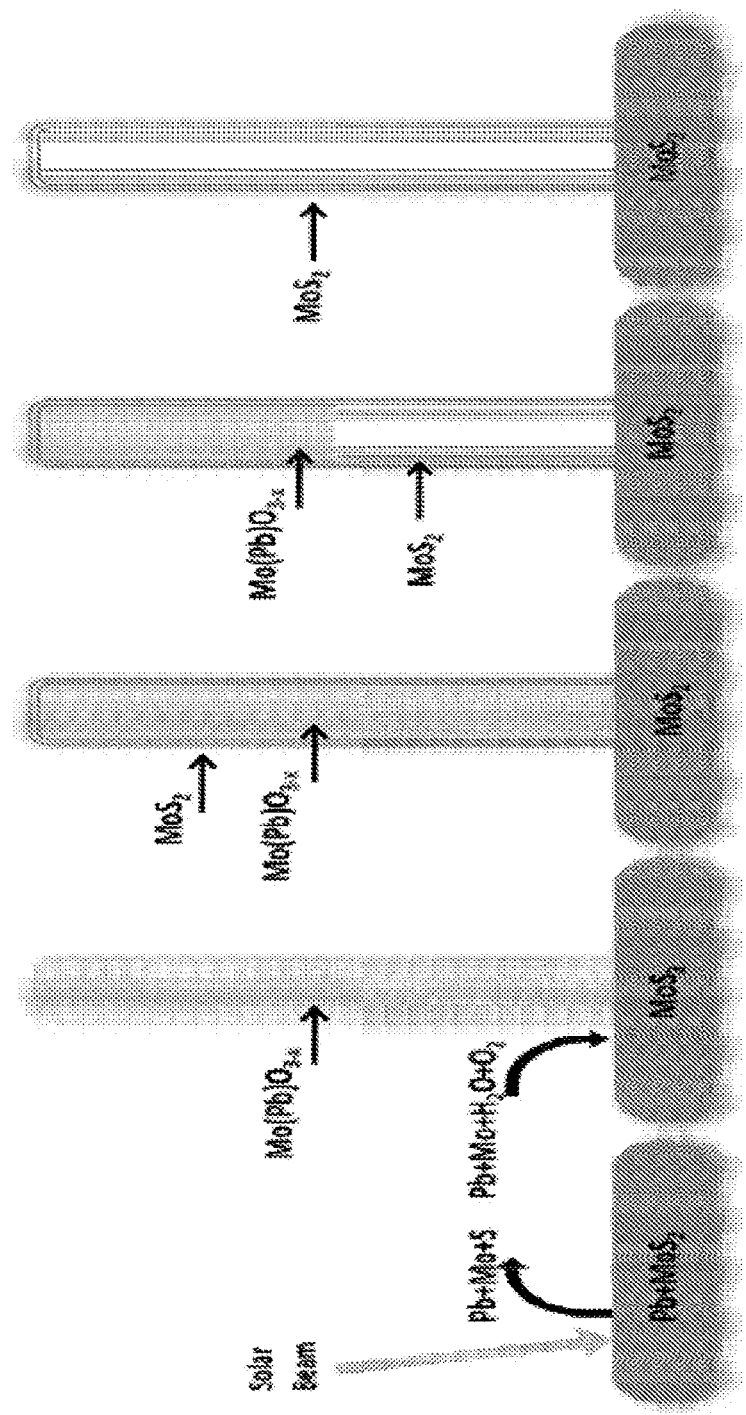
FIG. 5 is a schematic presentation of the formation mechanism of $MoS_2$ nanotubes.

Without wishing to be bound by theory, the growth of $MoS_2$ nanotubes can be described by a three-step process, shown schematically in FIG. 5. In the first step, intense radiative heating rapidly evaporates $MoS_2$ platelets and Pb particles. A reaction of the hot Mo (and S) vapor with the surrounding gas phase during the next few seconds promotes the growth of fully crystalline $MoO_{3-x}$ nanowhiskers. Since these serve as templates for nanotube growth, i.e., for oxide-to-sulfide conversion, the nanowhisker size dictates the nanotube size. The Pb atoms appear to stabilize the $MoO_{3-x}$ nanowhisker phases that are eventually transformed to INT-$MoS_2$. It is not unlikely though that the Pb atoms also serve as catalysts for the chemical reaction converting the $MoS_2$ powder into $MoO_{3-x}$ nanowhiskers.

In the second step, during the ensuing minutes, a concerted surface reaction leads to the engulfment of $MoO_{3-x}$ nanowhiskers by a continuous shell consisting of 2-3 $MoS_2$ layers. In the third step, the inner $MoO_{3-x}$ phase continuously transforms into $MoS_2$ starting from the base of $MoS_2$ platelets and progressing to their closed end. The slow conversion of the oxide nanowhisker core into $MoS_2$ nanotubes is critically dependent on the proximity to the $MoS_2$ platelets, which, under intense heating, gradually decompose, supplying the sulfur-rich atmosphere.

Numerous attempts to synthesize $MoS_2$ nanotubes in a conventional oven (up to 1000° C.) or induction furnace (up to 1600° C.), with the same precursor materials, did not yield nanotubes; neither did solar ablation of $MoO_3$ powder mixed with Pb and S The success of solar ablation in the Pb-mediated generation of $MoS_2$ nanotubes and the elucidation of their growth mechanism prompted attempting the same procedure for $MoSe_2$, $WS_2$ and $WSe_2$.

Figure 6A:
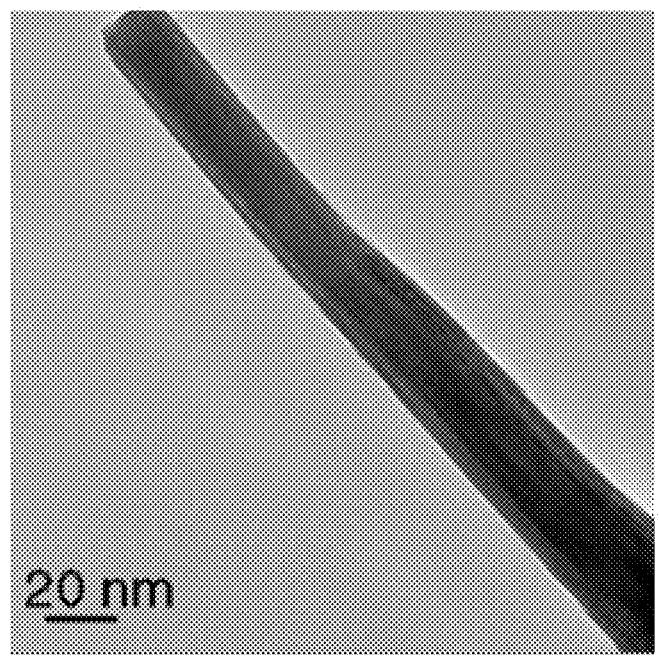
FIGS. 6A-6B are TEM images of $MoSe_2$ nanotubes after irradiation of the precursors for 600 s.
Figure 6B:
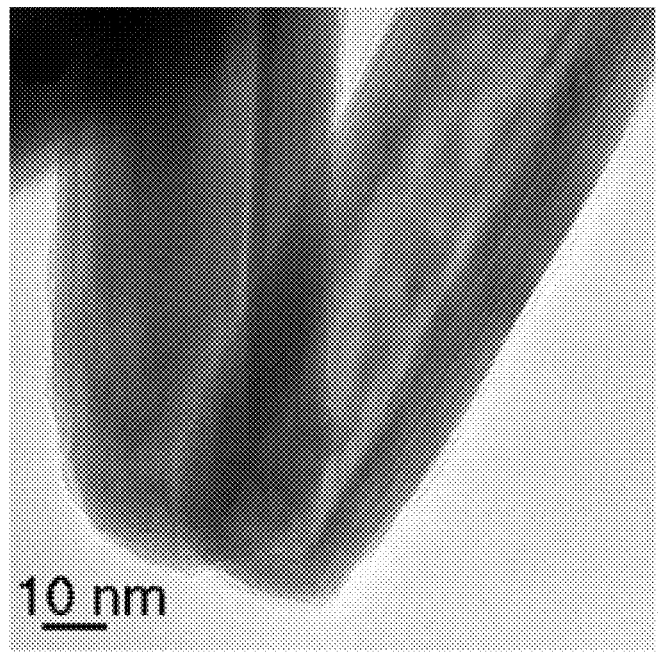

$MoSe_2$:

Solar ablation succeeded in generating INT-$MoSe_2$ when $MoSe_2$ powder and Pb were irradiated in an evacuated ampoule for 600 s (FIG. 6). The $MoSe_2$ nanotubes had dimensions comparable to those of $MoS_2$, containing a small amount of Pb, and being partially filled with $MoO_{3-x}$.

Figure 7A:
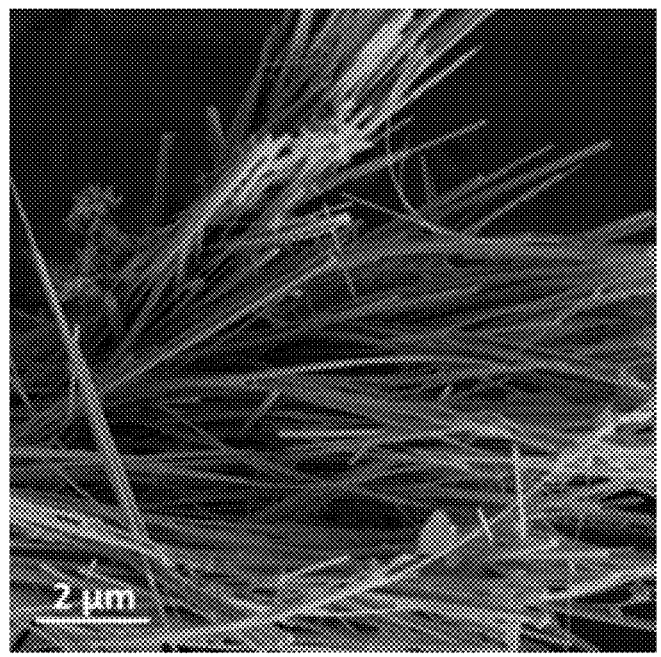
FIGS. 7A-7B show $WS_2$ nanotubes after the irradiation of the precursors for 600 s: (A) SEM image, and (B) TEM image.
Figure 7B:
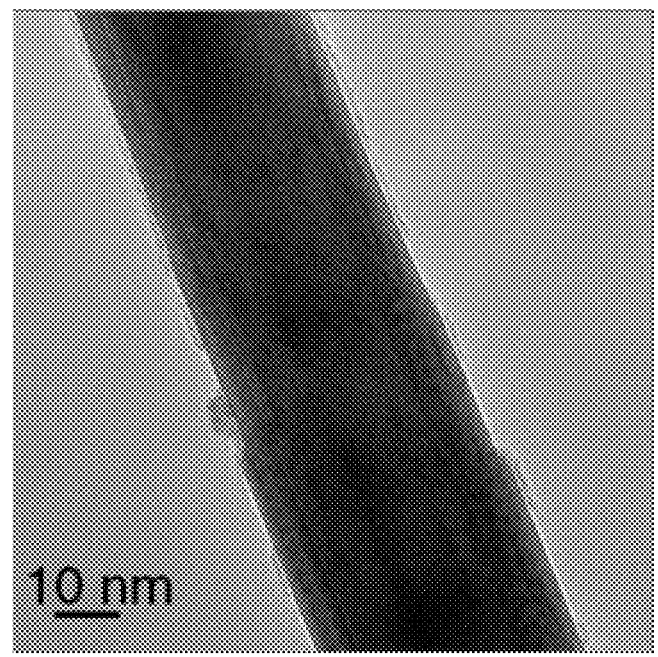

$WS_2$:

Solar ablation for 600 s also yielded $WS_2$ nanotubes partially filled with $WO_{3-x}$ (FIG. 7) and traces of Pb. The nanotubes were 50 nm wide, with lengths varying from 100 nm to more than 10 μm. The number of $WS_2$ layers varied from 2 to more than 10.

Figure 8A:
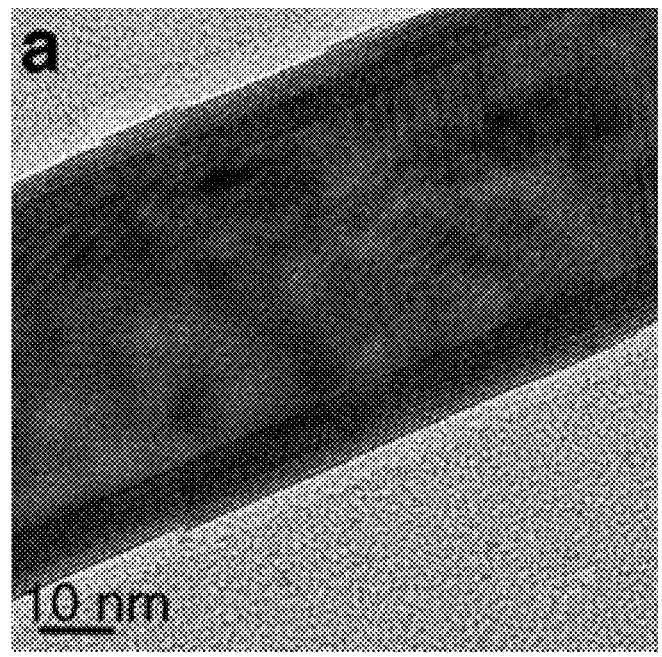
FIGS. 8A-8B show TEM images of $WSe_2$ nanotubes after the irradiation of the precursors for 600 s: (A) Hollow $WSe_2$ nanotube, and (B) $WSe_2$ nanotube filled with $WO_{3-x}$.
Figure 8B:
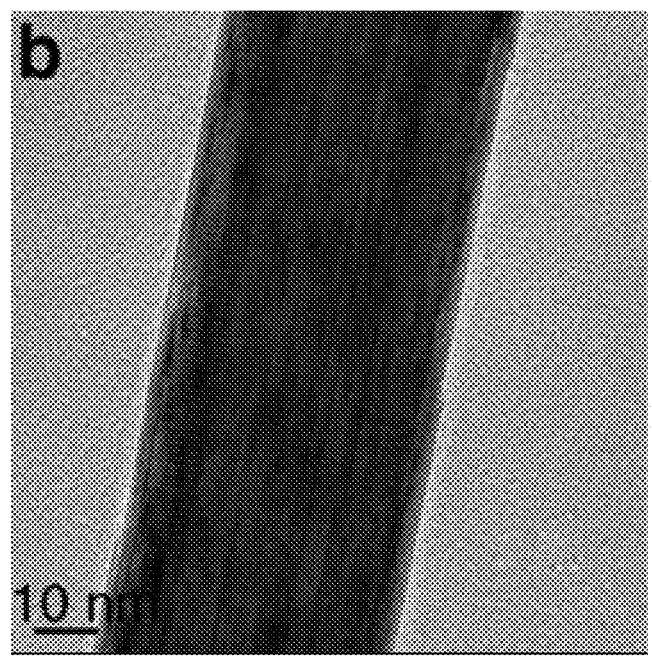

$WSe_2$:

Solar ablation of $WSe_2$ and Pb for 600 s yielded both hollow $WSe_2$ nanotubes as well as nanotubes partially filled with $WO_{3-x}$ (FIG. 8) and traces of Pb. The $WSe_2$ nanotubes had dimensions comparable to those of $WS_2$.

The $MoSe_2$ nanotube dimensions were comparable to those of $MoS_2$ nanotubes, although the $WS_2$ and $WSe_2$ nanotubes were much longer than the $MoS_2$ nanotubes. In all cases the nanotubes were partially filled with corresponding sub-oxide and trace quantities of Pb.

Other preparation routes for of Pb-doped $MoO_3$ nanowires as precursors to $MoS_2$ nanotubes.

Several other ways have been employed for obtaining $MoO_3$ nanowires, doped with Pb, as precursors for preparation of $MoS_2$ nanotubes. These alternative processes do not require the extreme temperature of solar ablation.

Annealing of Mo Powder in Air 1 g Mo powder was thoroughly mixed with 200 mg Pb powder. The solid mixture was placed in a flow system which was heated to 950° C. under oxygen gas flow. After 1 and half hour the oven was allowed to cool and the powder was retracted from the oven and was allowed to cool, resulting in $Mo(Pb)O_3$ nanowires.

Electrospinning of Molybdenum Oxide+$Pb(NoO3)2$/Polymer Hybrid and Calcination 1M molybdenum isopropoxide solution was prepared and mixed with 0.1 mM polyvinylpyrrolidone in a volume ratio of 1:4, respectively. $Pb(NO_3)_2$ salt was dissolved in ethanol which was added to the above solution. The solutions were electrospun in air using a DC voltage power supply at 20 kV, a programmable syringe pump operated at a flow rate of 20 l/min, and an aluminum collector plate. The needle-to-collector distance was approximately 100 mm. Annealing of the $MoO_3$(Pb)/polymer hybrid matrix was carried out at 600° C. for 3 h, resulting in $Mo(Pb)O_3$ nanowires free of polymer.

Hydrothermal Reaction

Analytical grade sodium molybdate ($Na_2MoO_4$) together with $Pb(NO_3)_2$, were dissolved in distilled water, forming 20 ml of a 2M solution with respect to the molybdenate and 0.2M with respect to the Pb(Hg) salt. Then 15 ml perchloric acid was added slowly into the sodium molybdate solution, while stirring at the same time. The clear, colorless solution was sealed in a Teflon™-lined stainless autoclave at 160° C. for 24 h. The solid products of Pb(Hg)-doped $MoO_3$ were filtered, washed with distilled water, and dried in vacuum at 80° C. for 12 h.

Annealing of Molybdenum Oxide 0.3 g $PbO_2$ and 1 g $MoO_3$ powders were thoroughly mixed and placed in the oven at 900° C. with flow of fresh air (100 cc/min) for 1 hr.

The invention claimed is:

1. A metal-oxide elongated nanostructure of the formula $A_{1-z}M_z$-oxide, wherein A being a metal and M being a soft metal foreign atom within a lattice structure of A-oxide, M being different than A, wherein $0<z\leq0.05$.

2. The metal-oxide elongated nanostructure of claim 1, wherein A is selected from W, Mo, Re, Ti, Zr, Hf, Nb, Ta, Pt, Ru, Rh, Sn, In, and Ga.

3. The metal-oxide elongated nanostructure of claim 1, wherein M is selected from Pb, Bi, Sn, Sb, V, Ga, In, Hg, Nb and mixtures thereof.

4. The metal-oxide elongated nanostructure of claim 1, wherein the elongated nanostructure of the formula $A_{1-z}M_z$-oxide is selected from $W_{1-z}M_z$-oxide, $Mo_{1-z}M_z$-oxide, $A_{1-z}Pb_z$-oxide, $A_{1-z}Bi_z$-oxide, and $A_{1-z}Sn_z$-oxide.

5. The metal-oxide elongated nanostructure of claim 1, wherein the nanostructure is selected from a nanorod, a nanowire and a nanowhisker.

6. The metal-oxide elongated nanostructure of claim 1, wherein z is between 0.01 and 0.05 or wherein z is between 0.001 and 0.01.

7. A process for preparing a metal-oxide elongated nanostructure of the formula $A_{1-z}M_z$-oxide, A being a metal and M being a soft-metal foreign atom within a lattice structure of A-oxide, M being different than A, wherein $0<z\leq0.05$, the process comprising:

providing a source of A atoms and a source for M atoms, and treating the A atoms and the M atoms under conditions permitting the formation of elongated nanostructures of the formula $A_{1-z}M_z$-oxide, wherein said conditions are at least one of an oxidative environment, elevated temperature, and reduced pressure.

8. The process of claim 7, wherein A is selected from W, Mo, Re, Ti, Zr, Hf, Nb, Ta, Pt, Ru, Rh, Sn, In, and Ga.

9. The process of claim 7, wherein M is selected from Pb, Bi, Sn, Sb, V, Ga, In, Hg, Nb and mixtures thereof.

10. The process of claim 7, wherein the nanostructure is selected from a nanorod, a nanowire and a nanowhisker.

11. The process of claim 10, wherein the nanostructure is a nanowhisker grown perpendicularly to a surface of the A-atoms source.

12. The process of claim 7, wherein z is between 0.01 and 0.05 or wherein z is between 0.001 and 0.01.

13. The process of claim 7, wherein the source of A atoms is selected from A-chalcogenide, A-oxide, A-halide, and elemental A metal and wherein the source of M atoms is selected from M-chalcogenide, M-oxide, M-halide, M-nitrate, and elemental M metal.

14. The process of claim 7, wherein said oxidative environment is selected from atmospheric oxygen, water vapors and an oxidizer compound and wherein said elevated temperature is between about 500 and 1,500° C.

15. The process of claim 7, further comprising: preparing metal-chalcogenide nanotubes of the formula $A_{1-x}M_x$-chalcogenide, A being a metal and M being a soft-metal foreign atom within a lattice structure of A-chalcogenide, M being different than A, the process comprises exposing nanostructures in the form of nanowires or nanowhiskers of A-oxide of the formula $A_{1-z}M_z$-oxide, in solid phase, to a chalcogen-rich gaseous environment under conditions permitting transformation of $A_{1-z}M_z$-oxide to metal-chalcogenide nanotubes of the formula $A_{1-x}M_x$-chalcogenide, x being equal to or smaller than z, and wherein $0<z\leq0.05$, wherein said conditions are at least one of temperature, pressure and a period of time.

16. The process of claim 15, wherein the metal-chalcogenide nanotubes are selected from $W_{1-x}Pb_xS_2$, $Mo_{1-x}Pb_xS_2$, $W_{1-x}Pb_xSe_2$, $Mo_{1-x}Pb_xSe_2$, $Nb_{1-x}Bi_xSe_2$, and $Ta_{1-x}Sn_xTe_2$.

17. The process of claim 15, wherein x is at most 0.01 and wherein z is between 0.01 and 0.05.

18. The process of claim 15, wherein said temperature is between 500 and 1500° C. and wherein said period of time is between 30 and 1,500 seconds.

19. A process for preparing metal-chalcogenide nanostructures of the formula $A_{1-x-y}M_xB_y$-chalcogenide, A being a metal and M being a soft-metal foreign atom within the lattice structure of A-chalcogenide, and B being a metal, the process comprising
providing a vapor phase comprising A-oxide of the formula $A_{1-z}M_z$-oxide according to claim 1 and B-oxide, provided that $A\neq B$ and $B\neq M$; and
permitting said vapor phase to counter-flow a gaseous composition comprising chalcogene-carrying reacting gas, under conditions permitting formation metal-chalcogenide nanostructures of the formula $A_{1-x-y}M_xB_y$-chalcogenide, x being equal to or smaller than z, and wherein $0<z\leq0.05$, wherein y is at most 0.3.

20. The process of claim 19, wherein A is selected from Mo, W, Re, Ti, Zr, Hf, Nb, Ta, Pt, Ru, Rh, Sn, In, and Ga.

21. The process of claim 19, wherein M is selected from Pb, Bi, Sn, Sb, V, Ga, In, Hg, Nb and mixtures thereof.

22. The process of claim 19, wherein B is a metal selected from Si, Nb, Ta, W, Mo, Sc, Y, La, Hf, Ir, Mn, Ru, Re, Os, V, Au, Rh, Pd, Cr, Co, Fe, and Ni.

23. The process of claim 19, wherein the metal-chalcogenide nanotubes are selected from $Mo_{1-x-y}Pb_xRe_yS_2$, $Mo_{1-x-y}Pb_xNb_yS_2$, $W_{1-x-y}Pb_xRe_yS_2$, $W_{1-x-y}Pb_xNb_yS_2$, $Mo_{1-x-y}Pb_xRe_ySe_2$, $Mo_{1-x-y}Pb_xNb_ySe_2$, $W_{1-x-y}Pb_xRe_ySe_2$, and $W_{1-x-y}Pb_xNb_ySe_2$.

24. The process of claim 19, wherein y is at most 0.01 and wherein z is between 0.01 and 0.05, and wherein x is at most 0.01.

25. The process of claim 19, wherein said gaseous composition comprises an inert carrying gas and a chalcogen-carrying reducing agent.

26. The process of claim 19, wherein said process further comprising:
providing a substrate comprising a metal-chalcogenide of the formula A-chalcogenide and a metal component M;
exposing the substrate to a first temperature for a first period of time in the presence of oxygen to obtain A-oxide of the formula $A_{1-z}M_z$-oxide in the form of nanowires or nanowhiskers; and
exposing the $A_{1-z}M_z$-oxide to a chalcogene-rich gaseous environment under reducing atmosphere at a second temperature for a second period of time to obtain the metal-chalcogenide nanotubes, x being equal to or smaller than z.

27. The process of claim 26, wherein said first temperature is between 1,600 and 3,500° C., and said second temperature is between 750 and 1,200° C., or wherein said first temperature and said second temperature are the same, and being between 750 and 1200° C., and wherein said first period of time is between 1 second and 30 minutes and wherein said second period of time is between 30 and 1500 minutes.

28. The process of claim 26, wherein said chalcogene-rich gaseous environment comprises a chalcogene-carrying reacting gas.

29. A process for preparing metal-chalcogenide nanotubes of the formula $A_{1-x}M_x$-chalcogenide, the process comprising exposing a composition that comprises a metal-chalcognide of the formula A-chalcogenide and a metal component M to a temperature of at least 1,600° C. for a predetermined period of time, to thereby obtain the metal-chalcogenide nanotubes.

30. The process of claim 29, wherein A is a metal selected from W, Mo, Re, Ti, Zr, Hf, Nb, Ta, Pt, Ru, Rh, Sn, In, and Ga and wherein M is a metal selected from Pb, Bi, Sn, Sb, V, Ga, In, Hg, Nb and mixtures thereof, and wherein said chalcogenide is selected from S, Se and Te.

31. The process of claim 29, wherein the metal-chalcogenide nanotubes are selected from $W_{1-x}Pb_xS_2$, $Mo_{1-x}Pb_xS_2$, $W_{1-x}Pb_xSe_2$, $Mo_{1-x}Pb_xSe_2$, $Nb_{1-x}Bi_xSe_2$, and $Ta_{1-x}Sn_xTe_2$.

32. The process of claim 29, wherein x is at most 0.01.

33. The process of claim 29, wherein the composition comprises A-chalcogenide and the metal component M at a molar ratio of 1:1.

34. The process of claim 29, wherein said temperature is in a range of between 1,600 and 3,500° C. and wherein said predetermined period of time is between 30 and 2000 seconds.

35. The process of claim 29, wherein in the metal-chalcogenide of the formula $A_{1-x}M_x$-chalcogenide, M atoms are incorporated in a lattice of A-chalcogenide.

36. An elongated nanostructure comprising at least one layer of a metal-chalcogenide the formula $A_{1-x}M_x$-chalcogenide, at least partially coating an inner core of the formula $A_{1-z}M_z$-oxide, x being equal to or smaller than z and wherein $0<z\leq0.05$.

37. The elongated nanostructure of claim 36, wherein A is a metal selected from W, Mo, Re, Ti, Zr, Hf, Nb, Ta, Pt, Ru, Rh, Sn, In, and Ga and wherein M is a metal selected from Pb, Bi, Sn, Sb, V, Ga, In, Hg, Nb and mixtures thereof, and wherein said chalcogenide is selected from S, Se and Te.

38. The elongated nanostructures of claim 36, in which M is Pb, Bi, or Sn, and wherein A is W or Mo, and wherein said chalcogenide is S or Se.

39. The elongated nanostructure of claim 36, wherein x is at most 0.01, and wherein z is between 0.01 and 0.05.

40. An elongated nanostructure having a radial dimension and a longitudinal dimension, the nanostructure comprising:
a first portion of said longitudinal dimension comprising a solid core of the formula $A_{1-z}M_z$-oxide at least partially coated by at least one layer of a metal-chalcogenide of the formula $A_{1-x}M_x$-chalcogenide, x being equal to or smaller than z, wherein $0 < z \leq 0.1$, and
a second portion of said longitudinal dimension comprising a hollow nanotube of a metal-chalcogenide of the formula $A_{1-x}M_x$-chalcogenide.

41. The elongated nanostructure of claim 40, wherein A is a metal selected from W, Mo, Re, Ti, Zr, Hf, Nb, Ta, Pt, Ru, Rh, Sn, In, and Ga; M is a metal selected from Pb, Bi, Sn, Sb, V, Ga, In, Hg, Nb and mixtures thereof; and said chalcogenide is selected from S, Se and Te.

42. The elongated nanostructure of claim 40, wherein x is at most 0.01 and z is between 0.01 and 0.05.

43. The elongated nanostructure of claim 40, wherein in the metal-chalcogenide of the formula $A_{1-x}M_x$-chalcogenide, M atoms are incorporated in a lattice of A-chalcogenide.

44. A composition comprising the nanostructure of claim 40, wherein said composition is selected from a lubricant composition, a shock absorbing composition, nanostructured electrical conductor, additives composition to lubricating fluids, a self-lubricating coating composition, creams, pharmaceutical creams and coatings.

* * * * *